US011352739B2

(12) United States Patent
Bell et al.

(10) Patent No.: US 11,352,739 B2
(45) Date of Patent: Jun. 7, 2022

(54) CREATING THREE-DIMENSIONAL APPAREL IMAGERY IN AN APPAREL DESIGN SYSTEM

(71) Applicant: Levi Strauss & Co., San Francisco, CA (US)

(72) Inventors: Benjamin Bell, San Francisco, CA (US); Christopher Schultz, San Francisco, CA (US); Jennifer Schultz, San Francisco, CA (US); Debdulal Mahanty, Fremont, CA (US)

(73) Assignee: Levi Strauss & Co., San Francisco, CA (US)

( * ) Notice: Subject to any disclaimer, the term of this patent is extended or adjusted under 35 U.S.C. 154(b) by 300 days.

(21) Appl. No.: 16/288,046

(22) Filed: Feb. 27, 2019

(65) Prior Publication Data

US 2020/0364383 A1 Nov. 19, 2020

Related U.S. Application Data

(60) Provisional application No. 62/636,112, filed on Feb. 27, 2018, provisional application No. 62/636,108, filed on Feb. 27, 2018.

(51) Int. Cl.
*D06M 10/00* (2006.01)
*A41H 43/00* (2006.01)
(Continued)

(52) U.S. Cl.
CPC ............. *D06M 10/005* (2013.01); *A41D 1/06* (2013.01); *A41D 27/00* (2013.01); *A41D 27/08* (2013.01);
(Continued)

(58) Field of Classification Search
CPC ........ A41H 43/00; A41H 3/08; B23K 26/352; G06F 30/20; G06F 30/12; G06F 30/00; G06F 30/17; G06F 3/011; G06F 3/0482; G06F 3/04845; G06F 2113/12; G06F 2111/20; A41D 1/06; A41D 27/00; A41D 27/08; A41D 2500/20; D03D 1/00; D06C 23/00; D06C 23/02; D06C 2700/31; D06M 10/005; G05B 19/4097;
(Continued)

(56) References Cited

U.S. PATENT DOCUMENTS 6,819,972 B1 * 11/2004 Martin ................... D06C 23/02
700/166
9,624,608 B2 * 4/2017 Martin ................... D03D 13/00
(Continued)

OTHER PUBLICATIONS

Kenkare. "Three Dimensional Modeling of Garment Drape". North Carolina State University. 2005. 263 Pages. (Year: 2005).*
(Continued)

*Primary Examiner* — Eunhee Kim
(74) *Attorney, Agent, or Firm* — Aka Chan LLP

(57) ABSTRACT

A system allows a user to create new designs for apparel and preview these designs before manufacture. Software and lasers are used in finishing apparel to produce a desired wear pattern or other design. The user's preview may be based upon a two-dimensional image of a wear pattern in a laser input file and, from a set of two-dimensional images of a base garment, create a three-dimensional view of the base garment with the wear pattern.

40 Claims, 25 Drawing Sheets

(51) Int. Cl.
*A41D 1/06* (2006.01)
*A41D 27/08* (2006.01)
*D03D 1/00* (2006.01)
*G06Q 30/06* (2012.01)
*G05B 19/4097* (2006.01)
*D06C 23/00* (2006.01)
*G06Q 10/06* (2012.01)
*D06C 23/02* (2006.01)
*G06F 30/00* (2020.01)
*A41D 27/00* (2006.01)
*G06F 3/01* (2006.01)
*G06T 19/00* (2011.01)
*G06T 19/20* (2011.01)
*G06F 3/0482* (2013.01)
*G06F 3/04845* (2022.01)
*G06T 3/00* (2006.01)
*B23K 26/352* (2014.01)
*A41H 3/08* (2006.01)
*G06F 30/20* (2020.01)
*G06F 30/12* (2020.01)
*G06F 30/17* (2020.01)
*G06F 113/12* (2020.01)
*G06F 111/20* (2020.01)

(52) U.S. Cl.
CPC ............... *A41H 3/08* (2013.01); *A41H 43/00* (2013.01); *B23K 26/352* (2015.10); *D03D 1/00* (2013.01); *D06C 23/00* (2013.01); *D06C 23/02* (2013.01); *G05B 19/4097* (2013.01); *G06F 3/011* (2013.01); *G06F 3/0482* (2013.01); *G06F 3/04845* (2013.01); *G06F 30/00* (2020.01); *G06F 30/12* (2020.01); *G06F 30/17* (2020.01); *G06F 30/20* (2020.01); *G06Q 10/06315* (2013.01); *G06Q 30/0621* (2013.01); *G06Q 30/0643* (2013.01); *G06T 3/005* (2013.01); *G06T 19/006* (2013.01); *G06T 19/20* (2013.01); *A41D 2500/20* (2013.01); *D06C 2700/31* (2013.01); *D10B 2201/02* (2013.01); *D10B 2501/04* (2013.01); *D10B 2501/06* (2013.01); *G05B 2219/35008* (2013.01); *G05B 2219/35012* (2013.01); *G05B 2219/45222* (2013.01); *G06F 2111/20* (2020.01); *G06F 2113/12* (2020.01); *G06T 2210/16* (2013.01)

(58) Field of Classification Search
CPC ........... G05B 2219/35008; G05B 2219/45222; G05B 2219/35012; G06Q 10/06315; G06Q 30/0621; G06Q 30/0643; G06T 3/005; G06T 19/006; G06T 19/20; G06T 2210/16; D10B 2201/02; D10B 2501/04; D10B 2501/06
See application file for complete search history.

(56) References Cited

U.S. PATENT DOCUMENTS

| | | | |
|---|---|---|---|
| 2005/0131571 A1* | 6/2005 | Costin | G06Q 30/0601 700/132 |
| 2009/0222127 A1* | 9/2009 | Lind | D04B 37/02 700/132 |
| 2014/0010449 A1* | 1/2014 | Haaramo | G06Q 30/06 382/173 |
| 2015/0066189 A1* | 3/2015 | Mulligan | G06Q 30/0621 700/136 |
| 2015/0275423 A1* | 10/2015 | Finley | D06P 1/6735 8/543 |

OTHER PUBLICATIONS

Sano. "Computer Aided Design System for Japanese Kimono". IEEE Instrumentation and Measurement Technology Conference Budapest, Hungary, May 21-23, 2001. Pages: 326-331. (Year: 2001).*

* cited by examiner

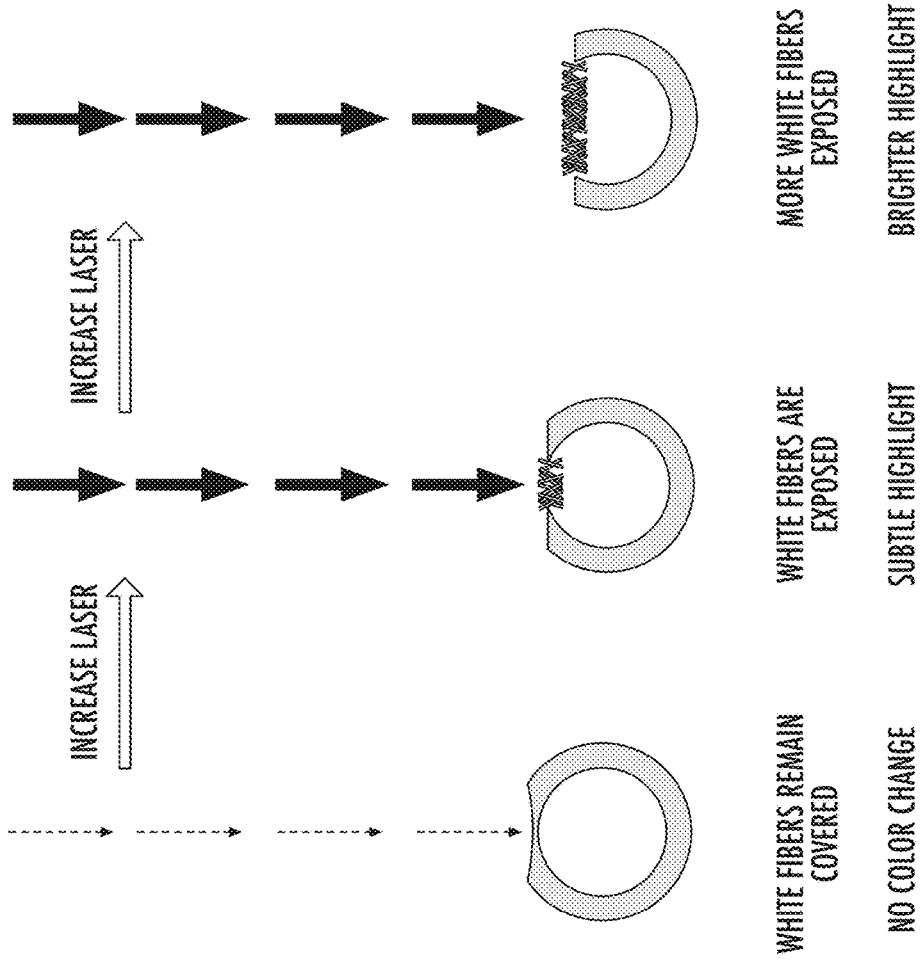
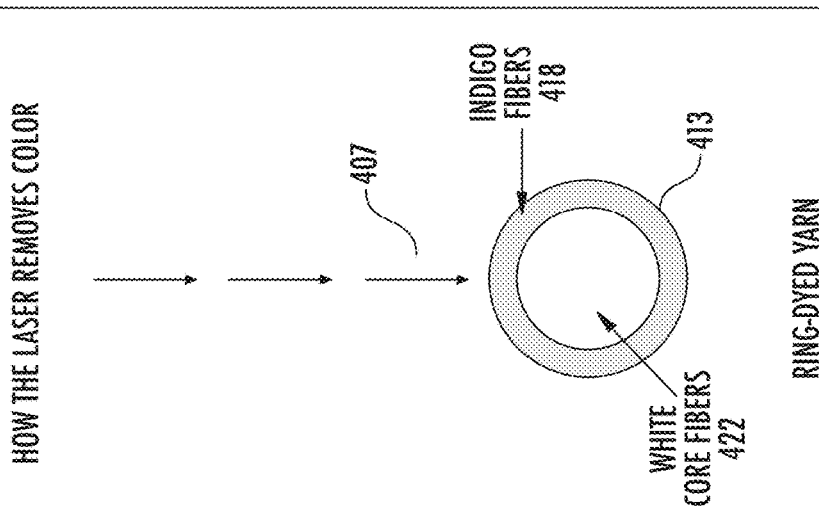

$$\text{ROTATION Z} \begin{pmatrix} \cos\theta & \sin\theta & 0 \\ -\sin\theta & \cos\theta & 0 \\ 0 & 0 & 1 \end{pmatrix}$$

$$\text{ROTATION Y} \begin{pmatrix} \cos\beta & 0 & \sin\beta \\ 0 & 1 & 0 \\ -\sin\beta & 0 & \cos\beta \end{pmatrix}$$

$$\text{ROTATION X} \begin{pmatrix} 1 & 0 & 0 \\ 0 & \cos\alpha & \sin\alpha \\ 0 & -\sin\alpha & \cos\alpha \end{pmatrix}$$

$$\text{SCALE IN 3D} \begin{bmatrix} S_x & 0 & 0 & 0 \\ 0 & S_y & 0 & 0 \\ 0 & 0 & S_z & 0 \\ 0 & 0 & 0 & 1 \end{bmatrix}$$

$$\text{TRANSLATION IN 3D} \begin{bmatrix} 1 & 0 & 0 & T_x \\ 0 & 1 & 0 & T_y \\ 0 & 0 & 1 & T_z \\ 0 & 0 & 0 & 1 \end{bmatrix}$$

$$\text{ROTATION Z} \begin{pmatrix} X \\ Y \\ Z \end{pmatrix} = \text{NEW X, Y, Z ROTATED BY } \theta \text{ ABOUT Z}$$

FIG. 30

CREATING THREE-DIMENSIONAL APPAREL IMAGERY IN AN APPAREL DESIGN SYSTEM

CROSS-REFERENCE TO RELATED APPLICATIONS

This patent application claims the benefit of U.S. patent applications 62/636,108 and 62/636,112, filed Feb. 27, 2018, which are incorporated by reference along with all other references cited in this application.

BACKGROUND OF THE INVENTION

The present invention relates to apparel finishing and, more specifically, the use of a laser in the finishing of garments, especially denim including jeans, shirts, shorts, jackets, vests, and skirts, to obtain a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co. or LS&Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with a variety of wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take about twenty to sixty liters of water to finish each pair of jeans.

Therefore, there is a need for an improved process for finishing jeans that reduces environmental impact, processing time, and processing costs, while maintaining the look and style of traditional finishing techniques. There is a need for a tool for creating and previewing patterns on jeans before laser finishing.

BRIEF SUMMARY OF THE INVENTION

A tool allows a user to create new designs for apparel and preview these designs before manufacture. Software and lasers are used in finishing apparel to produce a desired wear pattern or other design. Based on a laser input file with a pattern, a laser will burn the pattern onto apparel. With the tool, the user will be able to create, make changes, and view images of a design, in real time, before burning by a laser. Input to the tool includes fabric template images, laser input files, and damage input. The tool allows adding of tinting and adjusting of intensity and bright point. The user can also move, rotate, scale, and warp the image input.

In an implementation, a method for creating three-dimensional (3D) apparel imagery includes: providing a garment previewing tool that allows previewing on a computer screen of a selected garment base customized by a user with a finishing pattern created using a laser input file by a laser, where the garment previewing tool includes: providing an option for the user to select the garment base and upon the user's selection, showing a first garment preview imagery on the computer screen including a jeans base image for the selected garment base, providing an option for the user to select a wear pattern from a menu of wear patterns, where each wear pattern is associated with a laser input file to be used by a laser to produce that wear pattern onto a jeans garment, showing a second garment preview imagery on the computer screen including the selected wear pattern in combination with the jeans base image, where the second garment preview imagery replaces the first garment preview image, in the second garment preview imagery, allowing the user to select the wear pattern and modify a position or sizing of the wear pattern relative to the jeans base image, where as the user makes changes, the modified positioning or sizing of the wear pattern is displayed to the user in response to selecting and modifying the position or sizing of the wear pattern, and in response to modifying the position or sizing of the selected wear pattern, generating a third garment preview imagery of the selected garment base with the selected wear pattern. The third garment preview imagery includes: receiving a set of images of the selected garment base, without a wear pattern, where the set of images includes a plurality of two-dimensional images of the selected garment base, receiving a two-dimensional wear pattern image associated with the selected wear pattern, and generating a three-dimensional preview of the selected garment base with the selected wear pattern applied onto the surface of the selected garment base using the set of images of the selected garment base and the two-dimensional wear pattern image with the modified positioning or sizing of the selected wear pattern. The third garment preview imagery is shown on the computer screen including the jeans base image and selected wear pattern, with modified sizing or modified positioning, or a combination. The method includes providing a target garment corresponding to the garment base selected by the user; and, based on a laser input file associated with a selected wear pattern with modified sizing or modified positioning, or a combination, using a laser to create a finishing pattern on an outer surface of the target garment.

The method includes where the garment previewing tool includes: in response to selecting the wear pattern, generating the second garment preview imagery of the selected garment base with the selected wear pattern including generating another three-dimensional preview of the selected garment base with the selected wear pattern applied onto the surface of the selected garment base using the set of images of the selected garment base and the two-dimensional wear pattern image, where the second garment preview imagery includes the selected wear pattern in a different sizing or positioning than the third garment preview imagery.

The third garment preview imagery may be stored as a Graphics Interchange Format (GIF) image. The garment previewing tool may include allowing the user to see multiple views of the third garment preview imagery at different angles.

The method includes where the garment previewing tool includes: providing an option for the user to select another wear pattern from the menu of wear patterns, showing a fourth garment preview imagery on the computer screen including the other selected wear pattern in combination with the jeans base image, in the fourth garment preview imagery, allowing the user to select the other wear pattern and modify a position or sizing of the other wear pattern relative to the jeans base image, where as the user makes changes, the modified positioning or sizing of the other wear pattern is displayed to the user in response to selecting and modifying the position or sizing of the other wear pattern, and in response to modifying the position or sizing of the selected other wear pattern, generating a fifth garment preview imagery of the selected garment base with the selected other wear pattern including: receiving the set of images of the selected garment base, without a wear pattern, receiving another two-dimensional wear pattern image associated with the other selected wear pattern, and generating a three-dimensional preview of the selected garment base with the selected other wear pattern applied onto the surface of the selected garment base using the set of images of the selected garment base and the other two-dimensional wear pattern image with the modified positioning or sizing of the selected other wear pattern, showing the fifth garment preview imagery on the computer screen including the jeans base image and selected other wear pattern, with modified sizing or modified positioning, or a combination.

The method includes where a method of manufacturing the target garment includes: assembling the target garment from fabric panels of a woven first material including a warp including indigo ring-dyed cotton yarn, where the fabric panels are sewn together using thread.

The method includes where based on the laser input file, the laser removes selected amounts of material from the surface of a material of the target garment at different pixel locations of the garment, and for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed.

The method includes where when using the laser to create a finishing pattern, different laser levels are obtained by varying an output of the laser beam by altering a characteristic of the laser including at least one of a frequency, period, pulse width, power, duty cycle, or burning speed.

The method includes where the target garment is made of at least one of a twill material or a cotton twill material. The method includes where the garment base corresponds to a base fit fabric and the base fit fabric includes known characteristics regarding the suitability of the base fit fabric for finishing using the laser.

The method includes where the set of images of the selected garment base is generated using a contour generation process, where during the contour generation process, the selected garment base is worn by a mannequin. The method includes where the set of images of the selected garment base is generated using a contour generation process, where during the contour generation process, the selected garment base is not flat. The method includes where generating the third garment preview imagery is generated in near real-time with the user's modification of the sizing or positioning of the selected wear pattern.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-7 show how the laser alters the color of ring-dyed yarn.

FIG. 30 shows of a technique of shape projection.

DETAILED DESCRIPTION OF THE INVENTION

Figure 1:
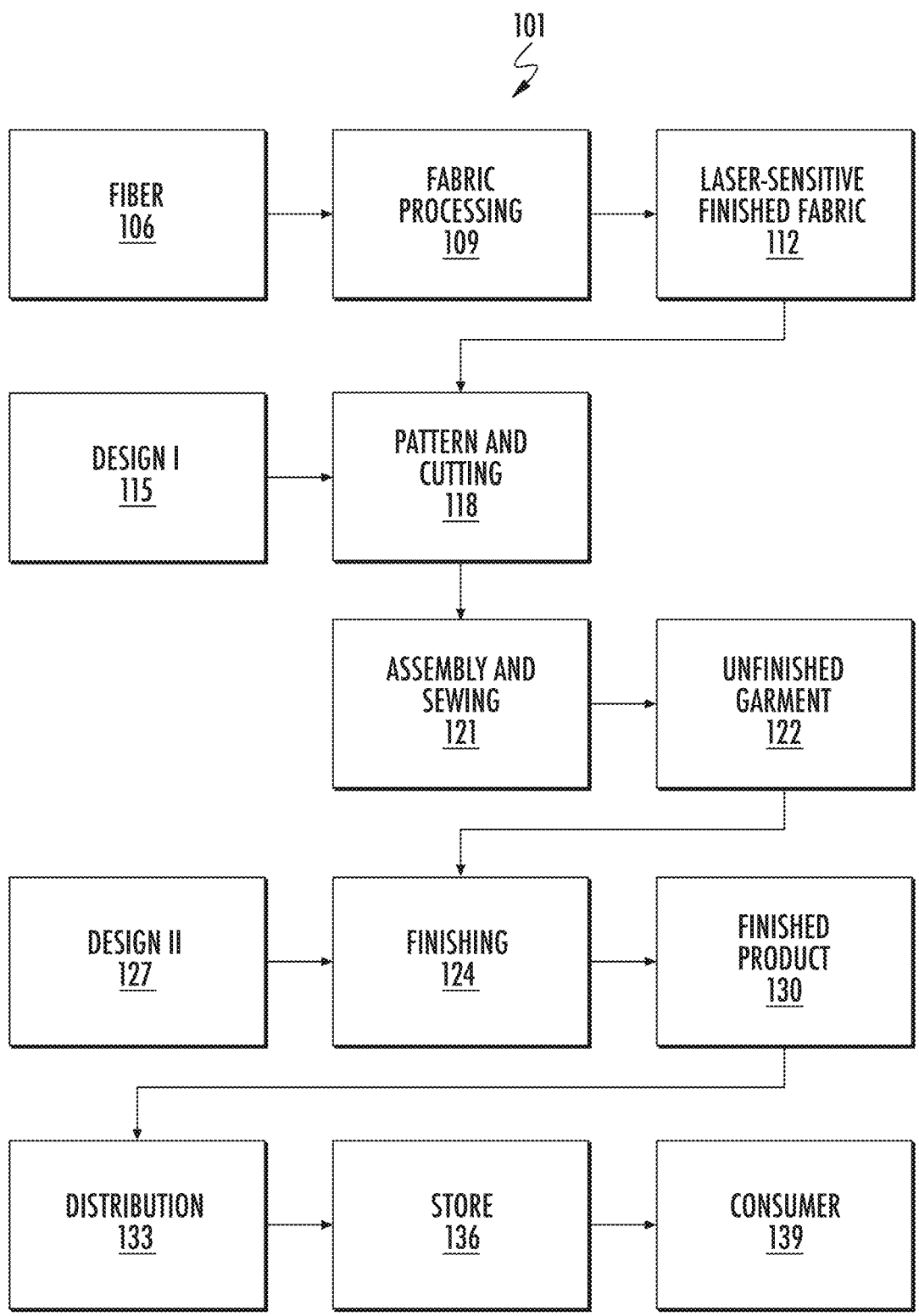
FIG. 1 shows a block diagram of a system for creating, designing, producing apparel products with laser finishing.

FIG. 1 shows a process flow 101 for manufacturing apparel such as jeans, where garments are finished using a laser. The fabric or material for various apparel including jeans is made from natural or synthetic fibers 106, or a combination of these. A fabric mill takes fibers and processes 109 these fibers to produce a laser-sensitive finished fabric 112, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandex), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The yarns (e.g., warp yarns) are dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including nondenim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 115 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 118 based on the design. The pattern pieces are assembled together 121 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 122 and have additional finishing 124, which includes laser finishing. The finishing may include tinting, washing, softening, and fixing. For distressed denim products, the finishing can include using a laser to produce a wear pattern according to a design 127 (design II). Some additional details of laser finishing are described in U.S. patent application 62/377,447, filed Aug. 19, 2016, and Ser. No. 15/682,507, filed Aug. 21, 2017, issued as U.S. Pat. No. 10,051,905 on Aug. 21, 2018, are incorporated by reference along with all other references cited in this application. U.S. patent applications 62/636,108, filed Feb. 27, 2018, and 62/715,788, filed Aug. 7, 2018, describe some specific implementations of a brief builder application and are incorporated by reference.

U.S. patent application Ser. No. 16/288,035, filed Feb. 27, 2019, Ser. No. 16/288,036 filed Feb. 27, 2019, issued as U.S. Pat. No. 11,051,571 on Jul. 6, 2021, Ser. No. 16/288,038, filed Feb. 27, 2019, issued as U.S. Pat. No. 10,918,151 on Feb. 16, 2021, Ser. No. 16/288,042, filed Feb. 27, 2019, issued as U.S. Pat. No. 11,000,086 on May 11, 2021, Ser. No. 16/288,047, filed Feb. 27, 2019, issued as U.S. Pat. No. 10,820,650 on Nov. 3, 2020, Ser. No. 16/288,048, filed Feb. 27, 2019, issued as U.S. Pat. No. 10,687,573 on Jun. 23, 2020, Ser. No. 16/288,050, filed Feb. 27, 2019, issued as U.S. Pat. No. 11,140,936 on Oct. 12, 2021, Ser. No. 16/288,053, filed Feb. 27, 2019, issued as U.S. Pat. No. 11,058,163 on Jul. 13, 2021, and Ser. No. 16/288,054, filed Feb. 27, 2019, are incorporated by reference.

Design 127 is for postassembly aspects of a garment while design 115 is for preassembly aspects of a garment. After finishing, a finished product 130 (e.g., a pair of jeans) is complete and ready for sale. The finished product is inventoried and distributed 133, delivered to stores 136, and sold to consumers or customers 139. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing.

Figure 2:
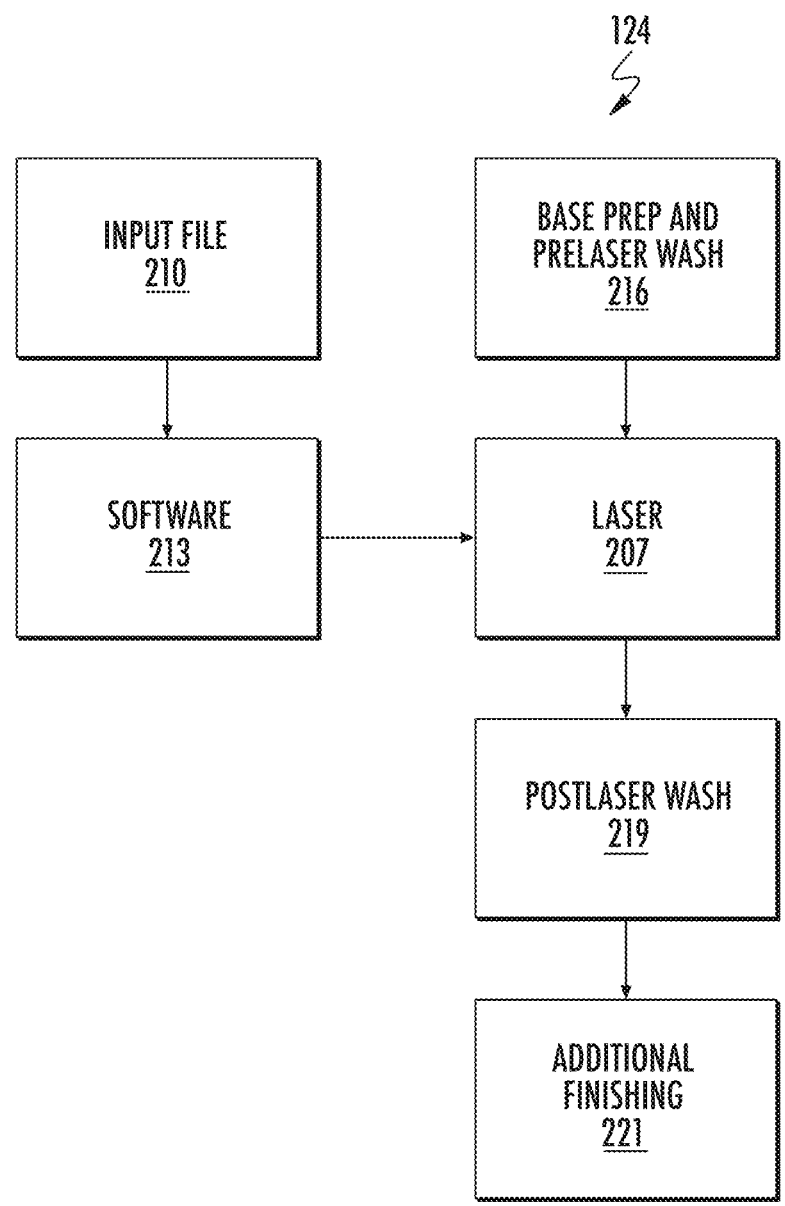
FIG. 2 shows a flow for a finishing technique that includes the use of a laser.

FIG. 2 shows a finishing technique that includes the use of a laser 207. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 210 and control software 213 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 210) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers having more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

Jeans are dyed using an indigo dye, which results in a blue colored fabric. The blue color is caused by chromophores trapped in the fabric which reflect light as a blue color. U.S. patent application 62/433,739, filed Dec. 13, 2016, which is incorporated by reference, describes a denim material with enhanced response characteristics to laser finishing. Using a denim material made from indigo ring-dyed yarn, variations in highs and lows in indigo color shading is achieved by using a laser.

Figure 3:
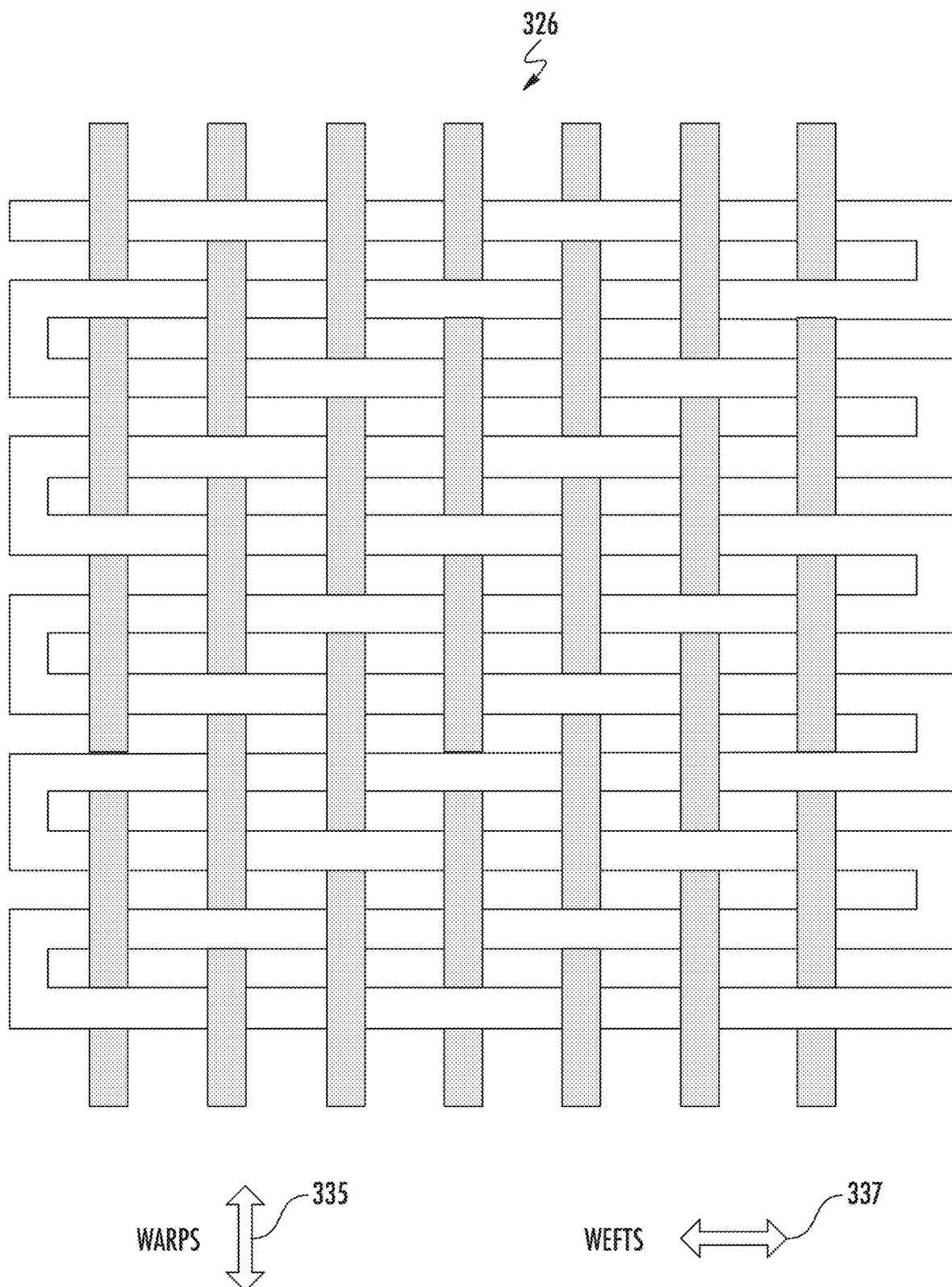
FIG. 3 shows a weave pattern for a denim fabric.

FIG. 3 shows a weave pattern of a denim fabric 326. A loom does the weaving. In weaving, warp is the lengthwise or longitudinal yarn or thread in a roll, while weft or woof is the transverse thread. The weft yarn is drawn through the warp yarns to create the fabric. In FIG. 3, the warps extend in a first direction 335 (e.g., north and south) while the wefts extend in a direction 337 (e.g., east and west). The wefts are shown as a continuous yarn that zigzags across the wefts (e.g., carried across by a shuttle or a rapier of the loom). Alternatively, the wefts could be separate yarns. In some specific implementations, the warp yarn has a different weight or thickness than the weft yarns. For example, warp yarns can be coarser than the weft yarns.

For denim, dyed yarn is used for the warp, and undyed or white yarn is typically used for the weft yarn. In some denim fabrics, the weft yarn can be dyed and have a color other than white, such as red. In the denim weave, the weft passes under two or more warp threads. FIG. 3 shows a weave with the weft passing under two warp threads. Specifically, the fabric weave is known as a 2×1 right-hand twill. For a right-hand twill, a direction of the diagonal is from a lower left to an upper right. For a left-hand twill, a direction of the diagonal is from a lower right to an upper left. But in other denim weaves, the weft can pass under a different number of warp threads, such as 3, 4, 5, 6, 7, 8, or more. In other implementation, the denim is a 3×1 right-hand twill, which means the weft passes under three warp threads.

Because of the weave, one side of the fabric exposes more of the warp yarns (e.g., warp-faced side), while the other side exposes more of the weft yarns (e.g., weft-faced side). When the warp yarns are blue and weft yarns are white, a result of the weave is the warp-faced side will appear mostly blue while the reverse side, weft-faced side, will appear mostly white.

In denim, the warp is typically 100 percent cotton. But some warp yarns can be a blend with, for example, elastane to allow for warp stretch. And some yarns for other fabrics may contain other fibers, such as polyester or elastane as examples.

In an indigo ring-dyed yarn, the indigo does not fully penetrate to a core of the yarn. Rather, the indigo dye is applied at a surface of the cotton yarn and diffuses toward the interior of the yarn. So when the yarn is viewed cross-sectionally, the indigo dyed material will appear as a ring on around an outer edge of the yarn. The shading of the indigo dye will generally lighten in a gradient as a distance increases from the surface of the yarn to the center (or core) of the yarn.

During laser finishing, the laser removes a selected amount of the surface of the indigo dyed yarn (e.g., blue color) to reveal a lighter color (e.g., white color) of the inner core of the ring-dyed yarn. The more of the indigo dyed material that is removed, the lighter the color (e.g., lighter shade of blue). The more of the indigo dyed material that remains, the darker the color (e.g., deeper shade of blue). The laser can be controlled precisely to remove a desired amount of material to achieve a desired shade of blue in a desired place or position on the material.

With laser finishing, a finish can be applied (e.g., printed or burned via the laser) onto apparel (e.g., jeans and denim garments) that will appear similar to or indistinguishable from a finish obtained using traditional processing techniques (e.g., dry abrasion, wet processing, and oxidation). Laser finishing of apparel is less costly and is faster than traditional finishing techniques and also has reduced environmental impact (e.g., eliminating the use of harsh chemical agents and reducing waste).

FIGS. 4-7 show how the laser alters the color of ring-dyed yarn. FIG. 4 shows a laser beam 407 striking a ring-dyed yarn 413 having indigo-dyed fibers 418 and white core fibers 422. The laser removes the dyed fibers, which can be by vaporizing or otherwise destroying the cotton fiber via heat or high temperature that the laser beam causes.

FIG. 5 shows the laser using a first power level setting or first exposure time setting, or a combination of these, to remove some of the dyed fibers, but not revealing any of the white core fibers. The undyed fibers remain covered. There is no color change.

FIG. 6 shows the laser using a second power level setting or second exposure time setting, or a combination of these, to remove more of the dyed fibers than in FIG. 5. The second power level is greater than the first power level, or the second exposure time setting is greater than the first exposure time setting, or a combination of these. The result is some of the undyed fibers are revealed. There is a color change, subtle highlighting.

FIG. 7 shows the laser using a third power level setting or third exposure time setting, or a combination of these, to remove even more of the dyed fibers than in FIG. 6. The third power level is greater than the second power level, or the third exposure time setting is greater than the second exposure time setting, or a combination of these. The result is more of the undyed fibers are revealed. There is a color change, brighter highlighting.

As shown in FIG. 2, before laser 207, the fabric can be prepared 216 for the laser, which may be referred to as a base preparation, and can include a prelaser wash. This step helps improves the results of the laser. After the laser, there can be a postlaser wash 219. This wash can clean or remove any residue caused by the laser, such as removing any charring (which would appear as brown or slightly burning). There can be additional finish 221, which may be including tinting, softening, or fixing, to complete finishing.

Figure 8:
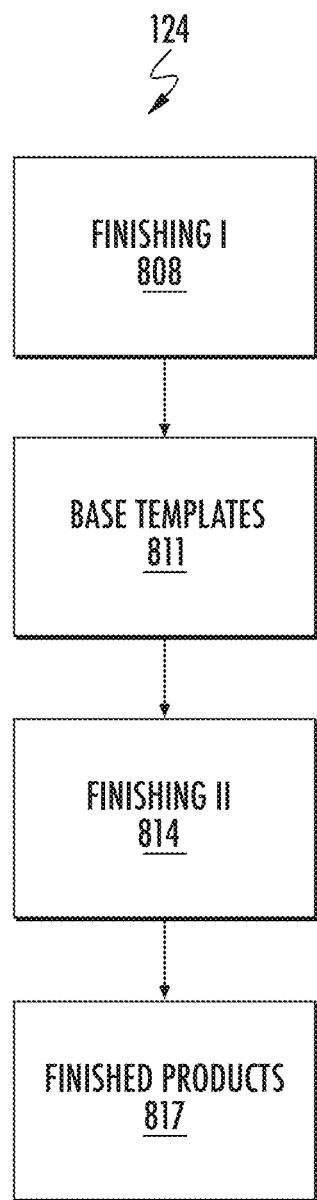
FIG. 8 shows a flow for finishing in two finishing steps and using base templates.

FIG. 8 shows a technique where finishing 124 is divided into two finishing steps, finishing I and finishing II. Finishing I 808 is an initial finishing to create base templates 811. With finishing II 814, each base template can be used to manufacture multiple final finishes 817.

Figure 9:
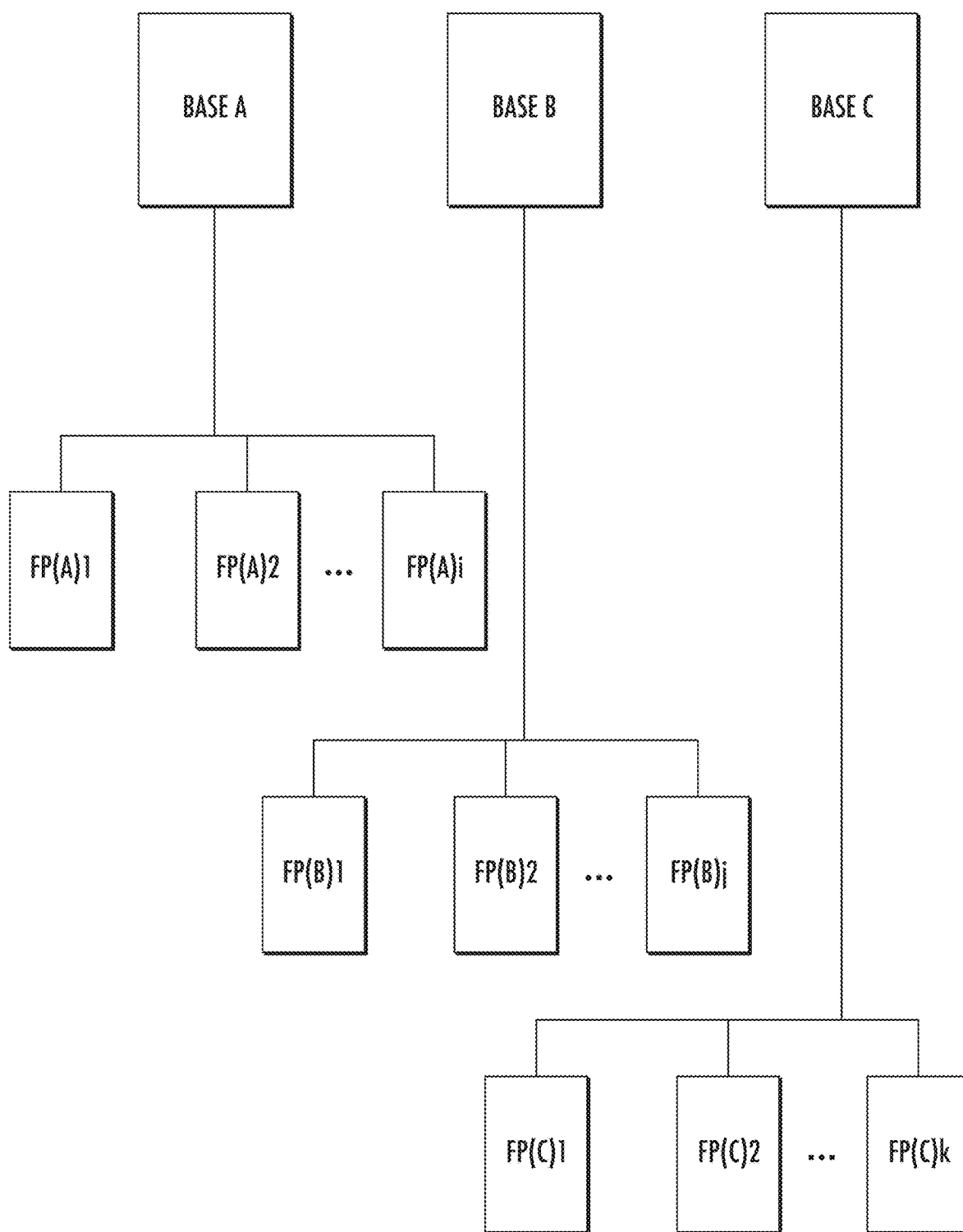
FIG. 9 shows multiple base templates and multiple resulting finished products from each of these templates.

FIG. 9 shows multiple base templates, base A, base B, and base C. These base templates may be referred to as base fit fabrics or BFFs. In an implementation, the base templates can be created during base prep and prelaser wash 216 (see FIG. 2). During finishing I, by using different wash 216 methods or recipes, each different base template can be created.

Finishing II can include laser finishing. Base A is lasered with different designs to obtain various final product based on base A (e.g., FP(A)1 to FP(A)i, where i is an integer). Base B is lasered with different designs to obtain various final products based on base B (e.g., FP(B)1 to FP(B)j, where j is an integer). Base C is lasered with different designs to obtain various final products based on base C (e.g., FP(C)1 to FP(C)k, where k is an integer). Each base can be used to obtain a number of different final designs. For example, the integers i, j, and k can have different values.

As described above and shown in FIG. 2, after finishing II, there can be additional finishing during post laser wash 219 and additional finishing 221. For example, during the postlaser wash, there may be additional tinting to the lasered garments. This tinting can result in an overall color cast to change the look of the garment.

In an implementation, laser finishing is used to create many different finishes (each a different product) easily and quickly from the same fabric template or BFF or "blank." For each fabric, there will be a number of base fit fabrics. These base fit fabrics are lasered to produce many different finishes, each being a different product for a product line. Laser finishing allows greater efficiency because by using fabric templates (or base fit fabrics), a single fabric or material can be used to create many different products for a product line, more than is possible with traditional processing. This reduces the inventory of different fabric and finish raw materials.

For a particular product (e.g., 511 product), there can be two different fabrics, such as base B and base C of FIG. 9. The fabrics can be part of a fabric tool kit. For base B, there are multiple base fit fabrics, FP(B)1, FP(B)2, and so forth. Using laser finishing, a base fit fabric (e.g., FP(B)1) can be used to product any number of different finishes (e.g., eight different finishes), each of which would be considered a different product model.

For example, FP(B)1 can be laser finished using different laser files (e.g., laser file 1, laser file 2, laser file 3, or others) or have different postlaser wash (e.g., postlaser wash recipe 1, postlaser wash recipe 2, postlaser wash recipe 3, or others), or any combination of these. A first product would be base fit fabric FP(B)1 lasered using laser file 1 and washed using postlaser wash recipe 1. A second product would be base fit fabric FP(B)1 lasered using laser file 2 and washed using postlaser wash recipe 1. A third product would be base fit fabric FP(B)1 lasered using laser file 2 and washed using postlaser wash recipe 2. And there can be many more products based on the same base fit fabric. Each can have a different product identifier or unique identifier, such as a different PC9 or nine-digit product code.

With laser finishing, many products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 10:
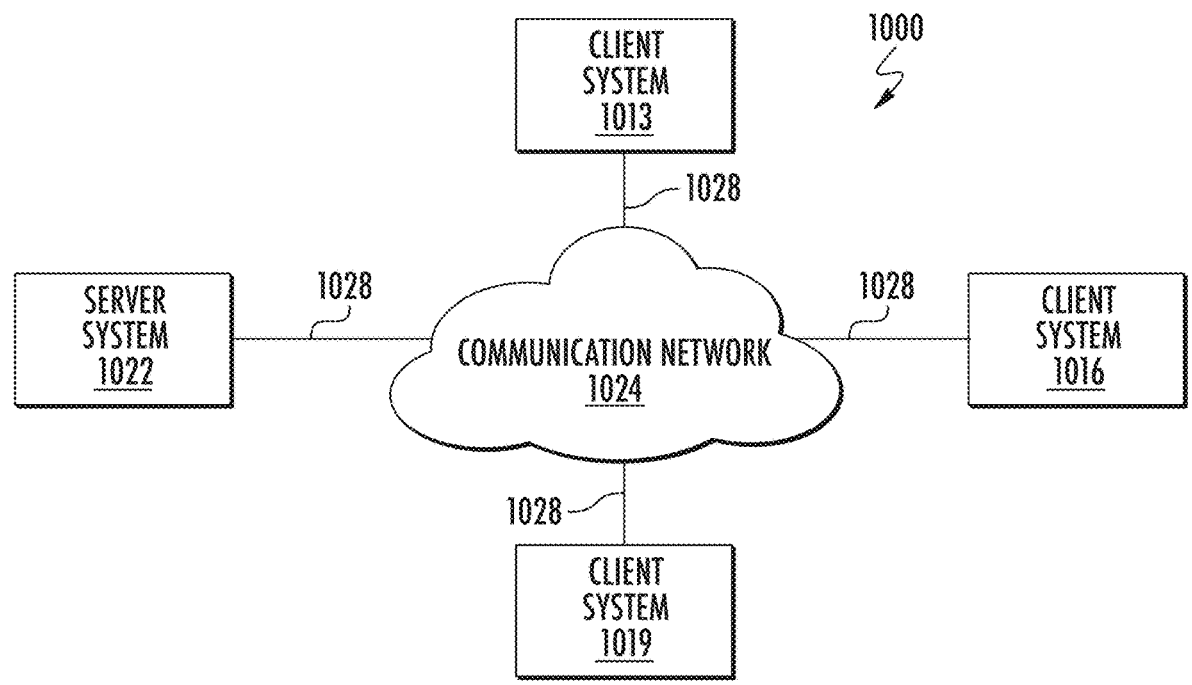
FIG. 10 shows a distributed computer network.

A system incorporating laser finishing can include a computer to control or monitor operation, or both. FIG. 10 shows an example of a computer that is component of a laser finishing system. The computer may be a separate unit that is connected to a system, or may be embedded in electronics of the system. In an embodiment, the invention includes software that executes on a computer workstation system or server, such as shown in FIG. 10.

FIG. 10 is a simplified block diagram of a distributed computer network 1000 incorporating an embodiment of the present invention. Computer network 1000 includes a number of client systems 1013, 1016, and 1019, and a server system 1022 coupled to a communication network 1024 via a plurality of communication links 1028. Communication network 1024 provides a mechanism for allowing the various components of distributed network 1000 to communicate and exchange information with each other.

Communication network 1024 may itself be comprised of many interconnected computer systems and communication links. Communication links 1028 may be hardwire links, optical links, satellite or other wireless communications links, wave propagation links, or any other mechanisms for communication of information. Communication links 1028 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 10. These communication protocols may include VLAN, MPLS, TCP/IP, Tunneling, HTTP protocols, wireless application protocol (WAP), vendor-specific protocols, customized protocols, and others. While in one embodiment, communication network 1024 is the Internet, in other embodiments, communication network 1024 may be any suitable communication network including a local area network (LAN), a wide area network (WAN), a wireless network, an intranet, a private network, a public network, a switched network, and combinations of these, and the like.

Distributed computer network 1000 in FIG. 10 is merely illustrative of an embodiment incorporating the present invention and does not limit the scope of the invention as recited in the claims. One of ordinary skill in the art would recognize other variations, modifications, and alternatives. For example, more than one server system 1022 may be connected to communication network 1024. As another example, a number of client systems 1013, 1016, and 1019 may be coupled to communication network 1024 via an access provider (not shown) or via some other server system.

Client systems 1013, 1016, and 1019 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 1022 is responsible for receiving information requests from client systems 1013, 1016, and 1019, performing processing required to satisfy the requests, and for forwarding the results corresponding to the requests back to the requesting client system. The processing required to satisfy the request may be performed by server system 1022 or may alternatively be delegated to other servers connected to communication network 1024.

Client systems 1013, 1016, and 1019 enable users to access and query information stored by server system 1022. In a specific embodiment, the client systems can run as a standalone application such as a desktop application or mobile smartphone or tablet application. In another embodiment, a "Web browser" application executing on a client system enables users to select, access, retrieve, or query information stored by server system 1022. Examples of Web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 11:
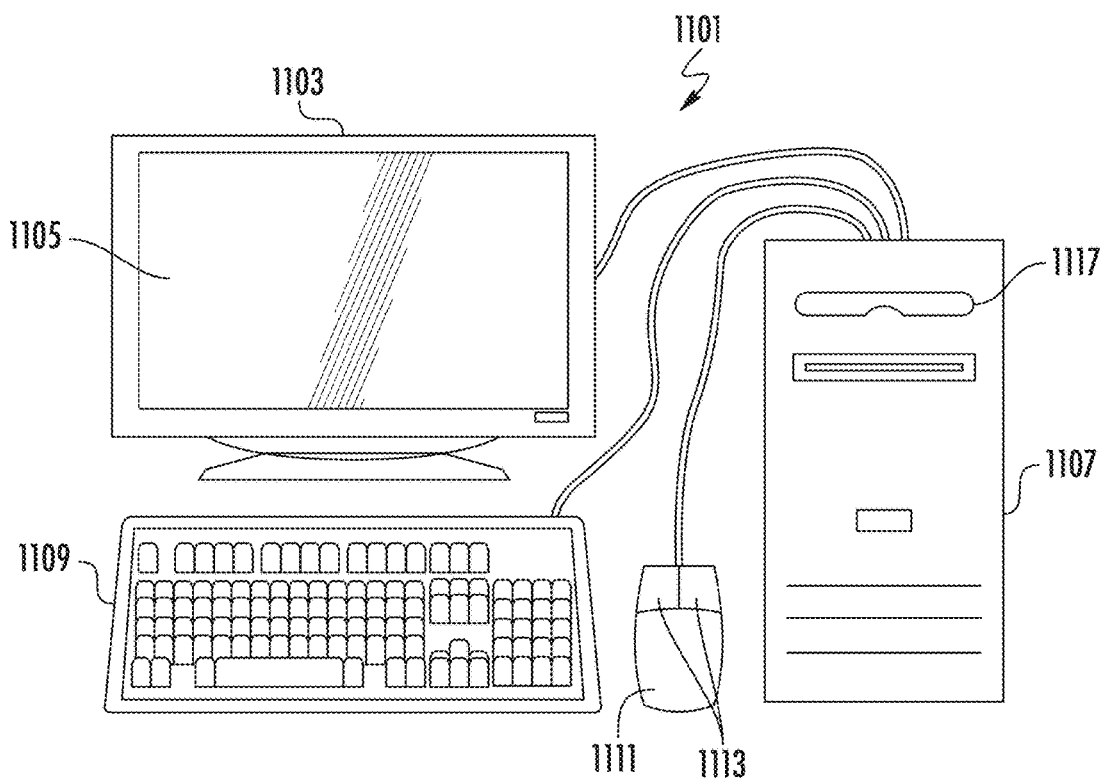
FIG. 11 shows a computer system that can be used in laser finishing.

FIG. 11 shows an exemplary client or server system of the present invention. In an embodiment, a user interfaces with the system through a computer workstation system, such as shown in FIG. 11. FIG. 11 shows a computer system 1101 that includes a monitor 1103, screen 1105, enclosure 1107 (may also be referred to as a system unit, cabinet, or case), keyboard or other human input device 1109, and mouse or other pointing device 1111. Mouse 1111 may have one or more buttons such as mouse buttons 1113.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad, Apple iPad Pro, or Apple iPad mini), Apple iPod (e.g, Apple iPod Touch), Samsung Galaxy product (e.g., Galaxy S series product or Galaxy Note series product), Google Nexus and Pixel devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 1107 houses familiar computer components, some of which are not shown, such as a processor, memory, mass storage devices 1117, and the like. Mass storage devices 1117 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 1117. The source code of the software of the present invention may also be stored or reside on mass storage device 1117 (e.g., hard disk, magnetic disk, tape, or CD-ROM). As a further example, code of the invention may be transmitted via wires, radio waves, or through a network such as the Internet.

Figure 12:
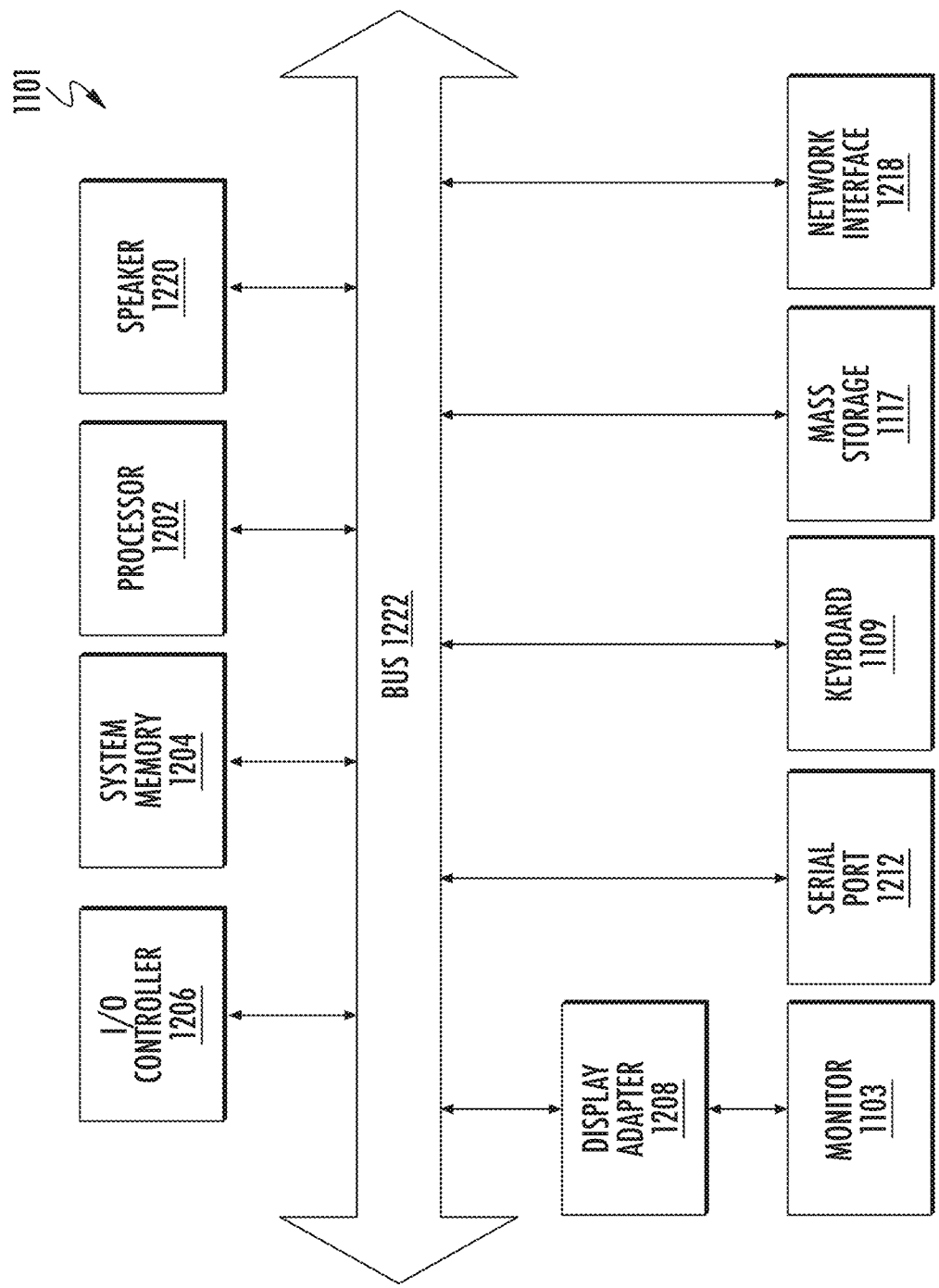
FIG. 12 shows a system block diagram of the computer system.

FIG. 12 shows a system block diagram of computer system 1101 used to execute the software of the present invention. As in FIG. 11, computer system 1101 includes monitor 1103, keyboard 1109, and mass storage devices 1117. Computer system 1101 further includes subsystems such as central processor 1202, system memory 1204, input/output (I/O) controller 1206, display adapter 1208, serial or universal serial bus (USB) port 1212, network interface 1218, and speaker 1220. The invention may also be used with computer systems with additional or fewer subsystems. For example, a computer system could include more than one processor 1202 (i.e., a multiprocessor system) or a system may include a cache memory.

Arrows such as 1222 represent the system bus architecture of computer system 1101. However, these arrows are illustrative of any interconnection scheme serving to link the subsystems. For example, speaker 1220 could be connected to the other subsystems through a port or have an internal direct connection to central processor 1202. The processor may include multiple processors or a multicore processor, which may permit parallel processing of information. Computer system 1101 shown in FIG. 12 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, MATLAB (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download Web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a Web application from one or more servers using a network connection with the server or servers and load the Web application in a Web browser. For example, a Web application can be downloaded from an application server over the Internet by a Web browser. Nonnative applications can also be obtained from other sources, such as a disk.

Figure 13:
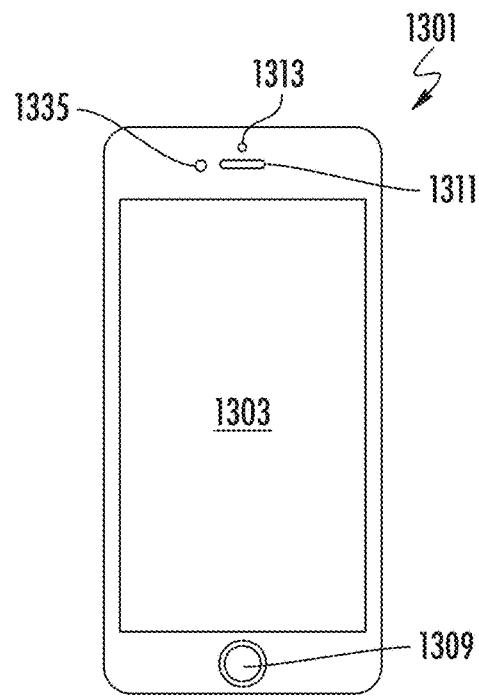
FIGS. 13-14 show examples of mobile devices.
Figure 14:
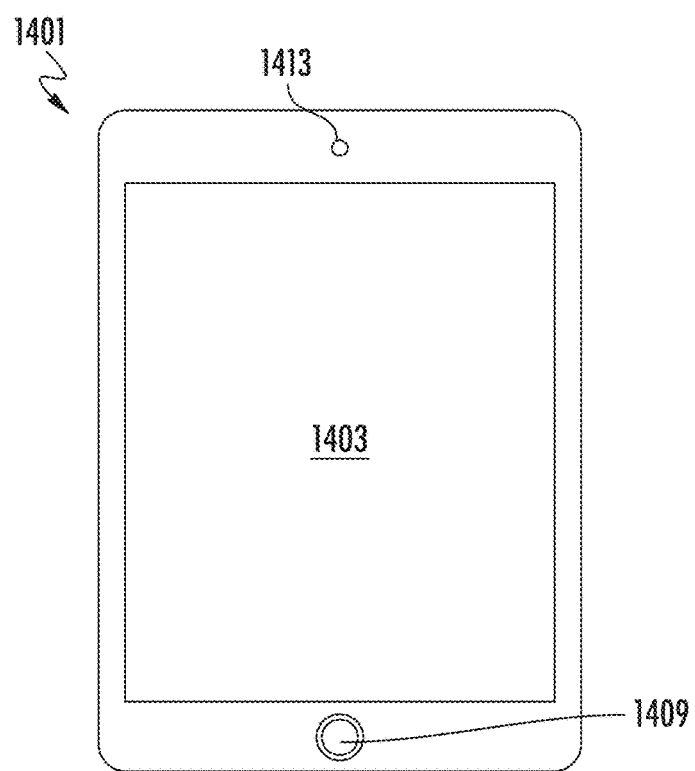

FIGS. 13-14 show examples of mobile devices, which can be mobile clients. Mobile devices are specific implementations of a computer, such as described above. FIG. 13 shows a smartphone device 1301, and FIG. 14 shows a tablet device 1401. Some examples of smartphones include the Apple iPhone, Samsung Galaxy, and Google Nexus family of devices. Some examples of tablet devices include the Apple iPad, Apple iPad Pro, Samsung Galaxy Tab, and Google Nexus family of devices.

Smartphone 1301 has an enclosure that includes a screen 1303, button 1309, speaker 1311, camera 1313, and proximity sensor 1335. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1309 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1401 is similar to a smartphone. Tablet 1401 has an enclosure that includes a screen 1403, button 1409, and camera 1413. Typically the screen (e.g., touch screen) of a tablet is larger than a smartphone, usually 7, 8, 9, 10, 12, 13, or more inches (measured diagonally).

Figure 15:
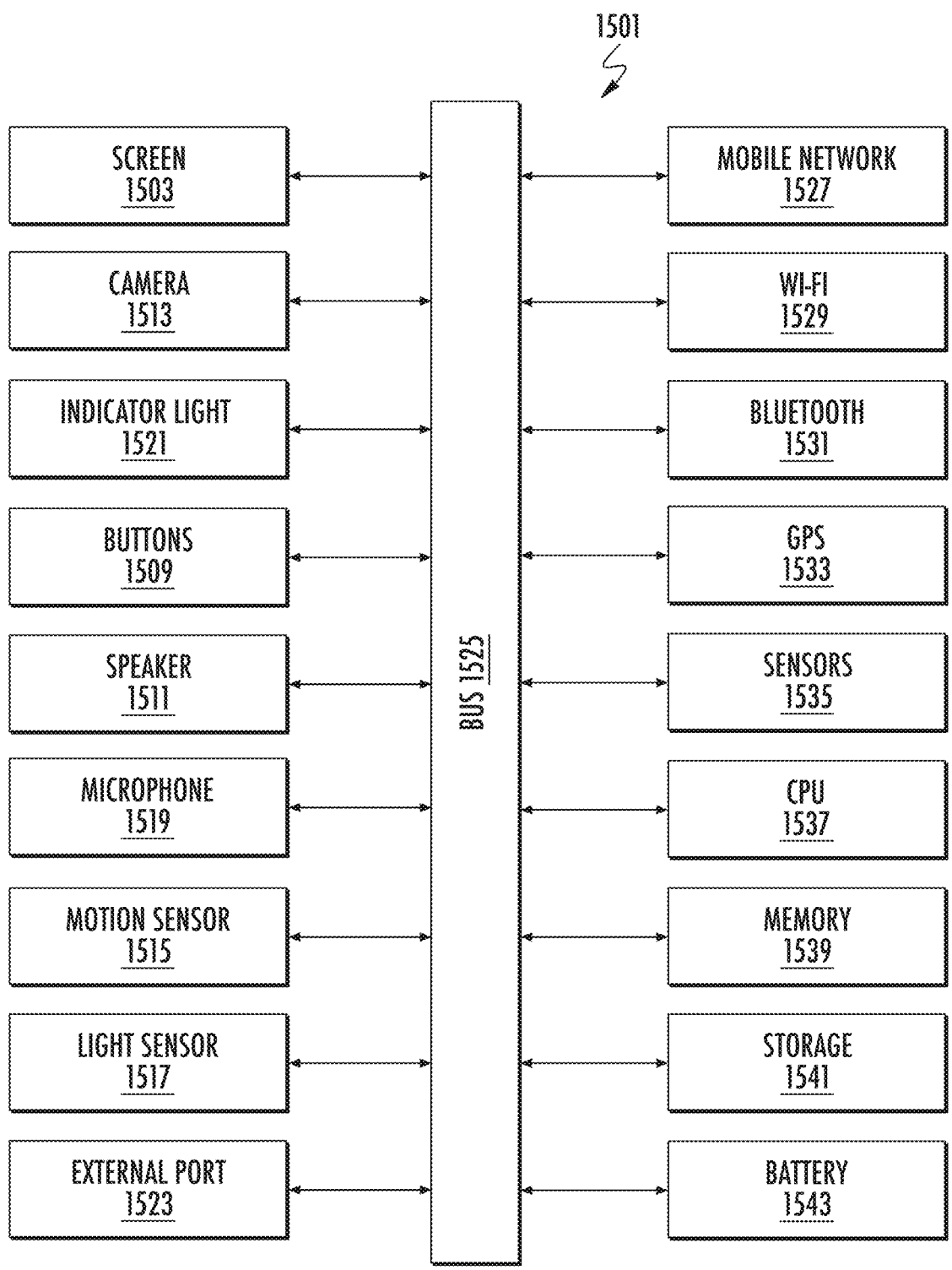
FIG. 15 shows a system block diagram of a mobile device.

FIG. 15 shows a system block diagram of mobile device 1501 used to execute the software of the present invention. This block diagram is representative of the components of smartphone or tablet device. The mobile device system includes a screen 1503 (e.g., touch screen), buttons 1509, speaker 1511, camera 1513, motion sensor 1515, light sensor 1517, microphone 1519, indicator light 1521, and external port 1523 (e.g., USB port or Apple Lightning port). These components can communicate with each other via a bus 1525.

The system includes wireless components such as a mobile network connection 1527 (e.g., mobile telephone or mobile data), Wi-Fi 1529, Bluetooth 1531, GPS 1533 (e.g., detect GPS positioning), other sensors 1535 such as a proximity sensor, CPU 1537, RAM memory 1539, storage 1541 (e.g. nonvolatile memory), and battery 1543 (lithium ion or lithium polymer cell). The battery supplies power to the electronic components and is rechargeable, which allows the system to be mobile.

Figure 16:
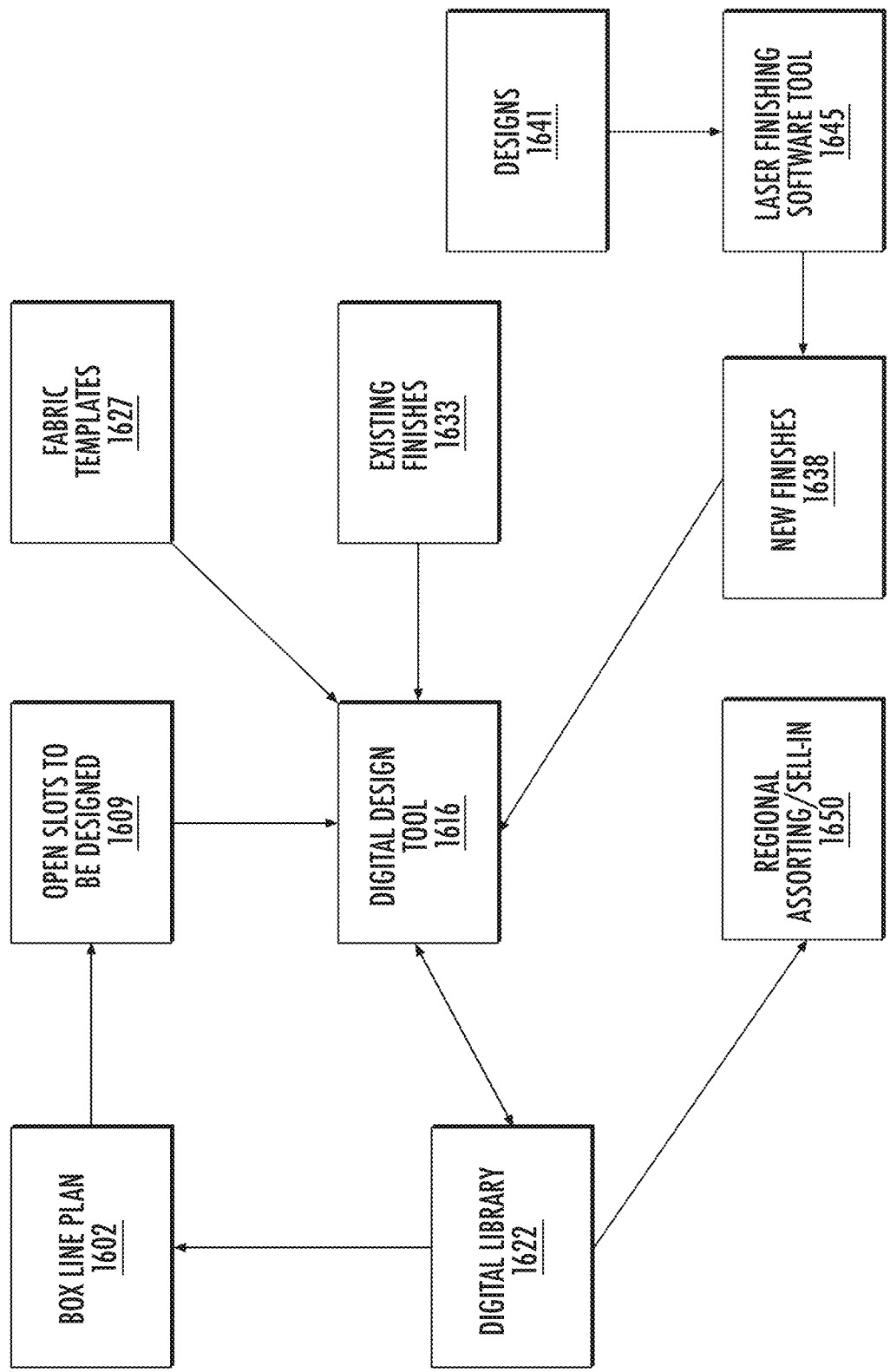
FIG. 16 shows a block diagram of a system for creating, designing, producing apparel products with laser finishing.

FIG. 16 shows a block diagram of a system for creating, designing, producing apparel products with laser finishing. A box line plan 1602 is an internal and interim tool for communication between a merchandising group and design group. Through the box line plan, merchandising can communicate what needs to be designed by the design group. The box line plan can have open slots to be designed 1609.

There is a digital design tool 1616 merchants and design can use to click and drag finish effects (e.g., laser files) and tint casts over images of base washes in order to visualize possible combinations and build the line visually before the garment finish is actually finished by the laser. The visualizations can be by rendering on a computer system, such as using three-dimensional (3D) graphics.

U.S. patent application 62/433,746, filed Dec. 13, 2016, which is incorporated by reference, describes a system and operating model of apparel manufacture with laser finishing. Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used be produce a multitude of laser finishes. Operational efficiency is improved.

Designers can use the digital design tool to design products that are used to satisfy the requests in open slots 1609. Designs created using the digital design tool can be stored in a digital library 1622. Input to the digital design tool include fabric templates or blanks 1627 (e.g., base fit fabrics or BFFs), existing finishes 1633 (e.g., can be further modified by the tool 1616), and new finishes 1638. New finishes can be from designs 1641 (e.g., vintage design) captured using a laser finish software tool 1645, examples of which are described in U.S. patent applications 62/377,447, filed Aug. 19, 2016, and Ser. No. 15/682,507, filed Aug. 21, 2017. Digital library 1622 can be accessible by the region assorting and sell-in 1650. And the digital library can be used populate or satisfy the box line plan.

Figure 17:
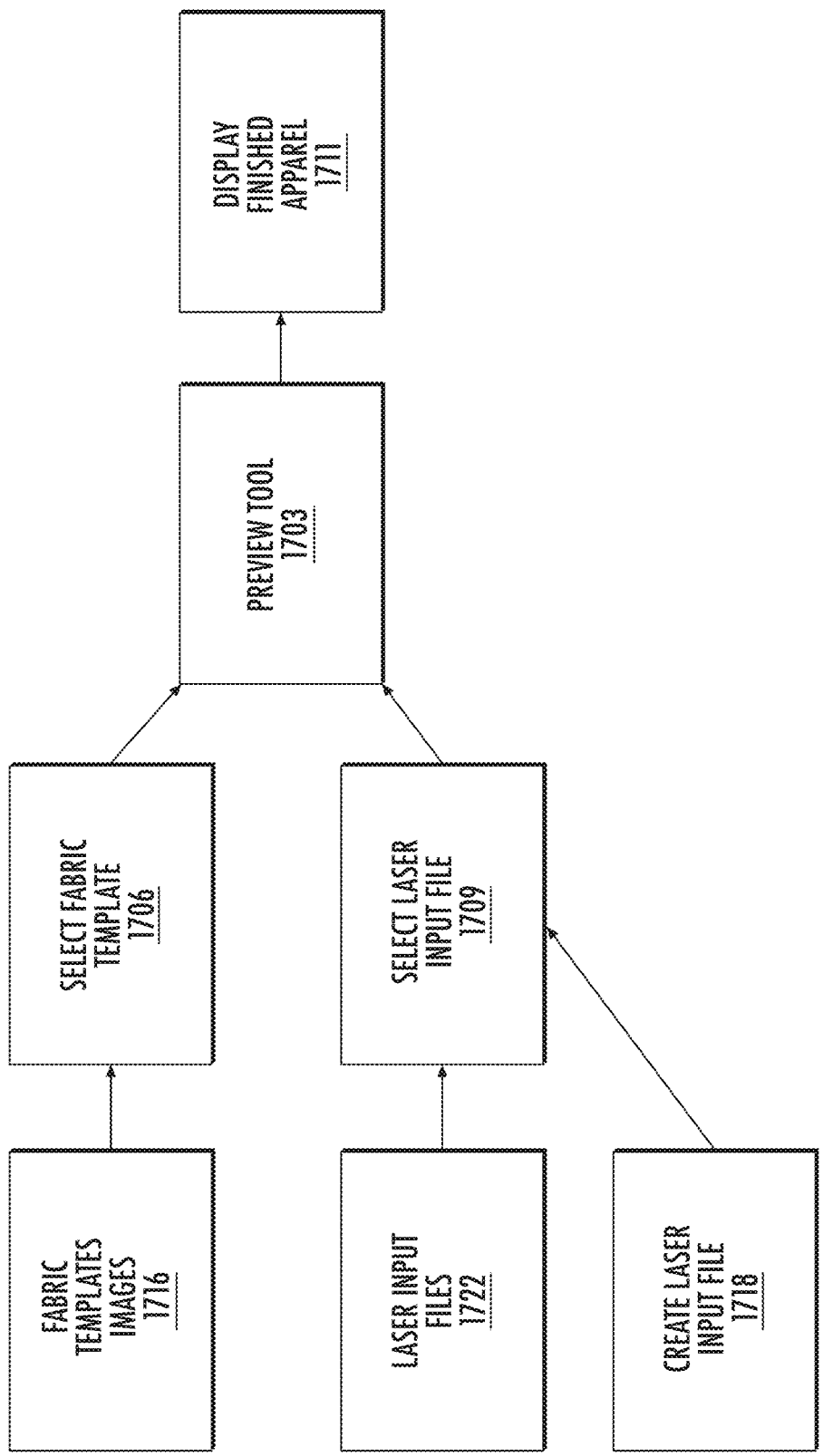
FIG. 17 shows a block diagram of a specific implementation of a preview tool.

FIG. 17 shows a block diagram of a specific implementation of a digital design tool, a preview tool 1703. Digital design tool 1616 can be representative of a collection of tools, such as an application suite, including desktop or mobile apps, or a combination.

Preview tool 1703 can be a single tool in a toolbox or toolkit used for laser finishing of garments, or the tool can be incorporated as a feature of another tool. The preview tool allows a user such as a clothing designer to preview on a computer screen or to generate a digital representation (e.g., image file, JPEG file, BMP file, TIFF file, GIF file, PNG file, PSD file, or others) of jeans in a selected base fit fabric or fabric template 1706 with a selected laser pattern 1709 (e.g., from a laser input file). With the digital representation, the user will be able to see or preview the jeans in the selected base fit fabric as if it had been burned with the selected laser input file, without needing to actually laser or burn the jeans.

Some files are described as being of an image file type. Some examples of image file types or file formats include bitmap or raster graphics formats including IMG, TIFF, EXIF, JPEG, GIF, PNG, PBM, PGM, PPM, BMP, and RAW. The compression for the file can be lossless (e.g., TIFF) or lossy (e.g., JPEG). Other image file types or file formats include vector graphics including DXF, SVG, and the like.

Bitmaps or raster graphics are resolution dependent while vector graphics are resolution independent. Raster graphics generally cannot scale up to an arbitrary resolution without loss of apparent quality. This property contrasts with the capabilities of vector graphics, which generally easily scale up to the quality of the device rendering them.

A raster graphics image is a dot matrix data structure representing a generally rectangular grid of pixels, or points of color, viewable via a monitor, paper, or other display medium. A bitmap, such as a single-bit raster, corresponds bit-for-bit with an image displayed on a screen or output medium. A raster is characterized by the width and height of the image in pixels and by the number of bits per pixel (or color depth, which determines the number of colors it can represent).

The BMP file format is an example of a bitmap. The BMP file format, also known as bitmap image file or device independent bitmap (DIB) file format or simply a bitmap, is a raster graphics image file format used to store bitmap digital images, independently of the display device. The BMP file format is capable of storing two-dimensional digital images of arbitrary width, height, and resolution, both monochrome and color, in various color depths, and optionally with data compression, alpha channels, and color profiles.

The fabric template can be selected from a library of fabric template images 1716 or may be a new image uploaded or provided by the user. Each fabric template images is an image file of a jeans in a base fit fabric or other material. For each jeans model or fit (e.g., models or fits 311, 501, 505, 511, 515, 541, 569, 721, and others), there would be one image in each different material or base fit fabric.

The laser input file can be selected from a library of laser input files 1722 (e.g., files created from vintage jeans or from a group of designers), may be a file 1718 created by the user, or may be a file uploaded or provided by the user. For example, the user may have created the laser pattern (contained within a laser input file) manually using a graphical or image editing tool (e.g., Adobe Photoshop and similar photo editing programs). Or the laser pattern may have been created by another, such as selected from a library of laser files. The laser pattern may be generated by a computer or automated process, such as may be used to obtain a laser pattern from vintage jeans. The user will be able to see the results of a burn, make any manual changes or alterations to the pattern (such as additional changes to a vintage jean pattern in a digital image file) and preview the results again. The preview tool allows a user to make and see changes, to the user can obtain feedback faster than having to laser jeans to see the results and also avoiding unneeded waste (e.g., preliminary versions of burned jeans).

Each digital representation can be saved in a separate images, and a group or set of the images can be a called brief of collection of jeans. The preview tool can be used for merchandising, such as generating images of a proposed line of products for a particular season, and these images can be shared among members of a team to discuss any additions, changes, or deletions to a collection.

A specific version of the preview tool overlays a fabric template input file and a laser input file, and then generates an image to display them together as a representation of the laser-finished apparel. The laser input file is aligned to the garment in the fabric template input file, so that the positioning of features in the laser input file and at appropriate positions or places on the garment. The alignment may be by using alignment marks that are in the input files. The alignment may be an automated alignment or scaling, or a combination.

Brightness, intensity, opacity, blending, transparency, or other adjustable parameters for an image layer, or any combination of these, are selected or adjusted for the laser input file, so that when the laser input file is overlaid above the fabric template image, the look of the garment will appear of simulate the look of a garment had been burned by a laser using that laser input file.

Adjustable parameters such as opacity can be used to blend two or more image layers together. For example, a layer's overall opacity determines to what degree it obscures or reveals the layer beneath it. For example, a layer with 1 percent opacity appears nearly transparent, while one with 100 percent opacity appears completely opaque.

Further, a dots per inch (dpi) of the combined image can be adjusted to also more properly simulate the look of a garment more closely with a burned garment. Dots per inch refers to the number of dots in a printed inch. The more dots, the higher the quality of the print (e.g., more sharpness and detail). By reducing the dpi of the image, this will reduce the image quality, resulting a blurring of the image. In an implementation, the preview tool reduces a dpi of the combined image, to be of less dpi than the fabric template input file or the laser input file. By blurring the preview image, this results in improved simulation that corresponds better to a burned laser garment. When burning a garment, the garment material or fabric typically limits the resolution of the result to less than that of the input file.

In an implementation, the dpi of the laser input file is about 72 dpi, while the dpi of the preview image is about 34 dpi. In an implementation, the dpi of the fabric template input file and laser input file are about 36 dpi or above, while the dpi of the preview image is about 36 dpi or lower.

Figure 18:
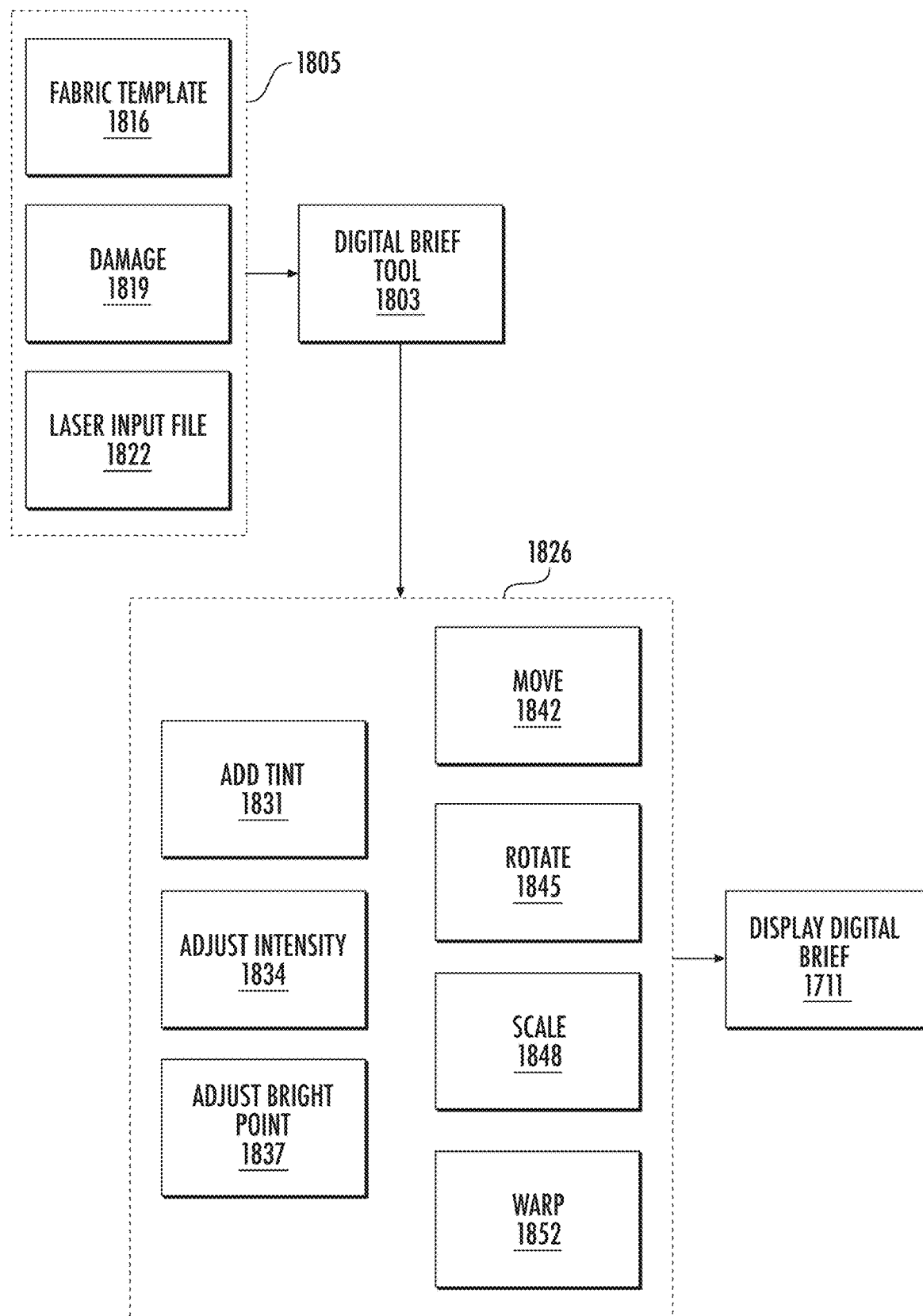
FIG. 18 shows a block diagram of a brief tool.

FIG. 18 shows a block diagram of a digital brief tool 1803, which also like preview tool 1703, provides a real-time preview of an appearance of pair of jeans when a finishing pattern is applied by burning using a laser input file. The digital brief tool has additional features to allow more flexible designing of jeans.

It should be understood that the invention is not limited to the specific flows and steps presented. A flow of the invention may have additional steps (not necessarily described in this patent), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data or situation.

The digital brief tool takes as input three types of digital assets 1805, fabric template input 1816, damage input 1819, and laser input file 1822. Fabric template input 1816 and laser input file 1822 are similar to the inputs for the preview tool. Damage input 1819 is an image of damage (e.g., holes, rips, shredded regions, or openings of various shapes and sizes) that can be burned by a laser into jeans. The digital brief tool overlays the damage and laser input files over the fabric template.

The user selects a fabric template input, which an image of a jeans style in a particular base fit fabric. The user can optionally select one or more damage inputs. If a damage input is selected, the damage input will be a layer that overlays the fabric template layer. As for the preview tool, the user selects a laser input file with laser pattern and overlays the fabric template layer. As the user selects the inputs, the user will be able to see in real time the inputs and any changes or updates in a preview image or brief.

After the inputs are selected, the user can select and perform one or more operations 1826 on the inputs using the digital brief tool. These operations including adding tint 1831, adjusting intensity 1834, adjusting bright point 1837, move digital asset 1842, rotate digital asset 1845, scale digital asset 1848, and warp digital asset 1852. As the user selects and performs one or more operations, the user will be able to see in real time the changes or updates in the preview image or brief.

After the fabric template input, the user can add tinting 1831. Tinting will adjust the hue of the color of the fabric template input. Tinting is representative of the tinting which can be added during the postlaser wash or finishing II, described above. The user will be able to select a tint color, and this tint color will be blended with the existing color of the fabric template input. The amount or intensity of the tinting can be increased or decreased, such as by using a slider bar.

The user can adjust intensity 1834. In an implementation, intensity adjusts a weight matrix by a percentage of each value in the array. In an implementation, intensity (or brightness) adjusts an opacity of a generated adjustment layer (see hue saturation lightness adjustment layer described below). The greater the opacity, the more opaque this layer will appear in the preview or brief image. The less the opacity, the less opaque this layer will appear in the preview or brief image; the layer will appear more transparent so that the layer beneath will show through more.

When increasing brightness, the opacity of the adjustment layer increases, and since the adjustment layer is above the fabric template input, the generated adjustment layer will become more prominent or visible, thus making this layer (which has the wear pattern) brighter. Similarly, when decreasing brightness, the opacity of the adjustment layer decreases, the generated adjustment layer will become less prominent or visible, thus making this layer (which has the wear pattern) less bright or fainter. The amount of the intensity can be increased or decreased, such as by using a slider bar.

The user can adjust bright point 1837. Bright point adjusts the effect of the laser input file on the fabric template input. In an implementation, bright point adjustment changes a midpoint of a grayscale, creating a piecewise linear mapping of the pattern file.

Increasing the bright point will increase an effect of the laser pattern (e.g., causing greater laser pattern highlights) in the laser input file on the fabric template input, while decreasing the bright point does the opposite (e.g., diminishing laser pattern highlights). The bright point adjustment can be analogous to changing a pixel time or the time that the laser stays at a particular position for a given input from the laser input file. The amount of the bright point can be increased or decreased, such as by using a slider bar.

The user can move 1842 or reposition a selected digital asset. For example, a damage input (or fabric template or laser file) may be moved to a position desired by the user. The user can rotate 1845 a selected digital asset. For example, a damage input (or fabric template or laser file) may be rotated to any angle relative to the other layers as desired by the user.

The user can scale 1848 a selected digital asset. This scaling can be locked, maintaining the original aspect ratio of the digital asset, or can be unlocked, such that the user can change the aspect ratio. The user can warp 1852 a selected digital asset. With warping, the user can adjust an aspect ratio of a portion of the digital asset differently from another portion. For example, one portion of a damage input (or fabric template or laser file) can be squished (e.g., right and left edges of image pushed toward each other) while another portion is expanded (e.g., right and left edges of image pulled away from each other).

After the user has performed selected operations 1826, the digital brief tool shows an image of the jeans with the laser finishing pattern, including any tinting, damage, or other adjustments, as created by the user. This image can be saved and viewed again later. A user can create multiple designs, and these can be saved together as part of a collection.

Figure 19:
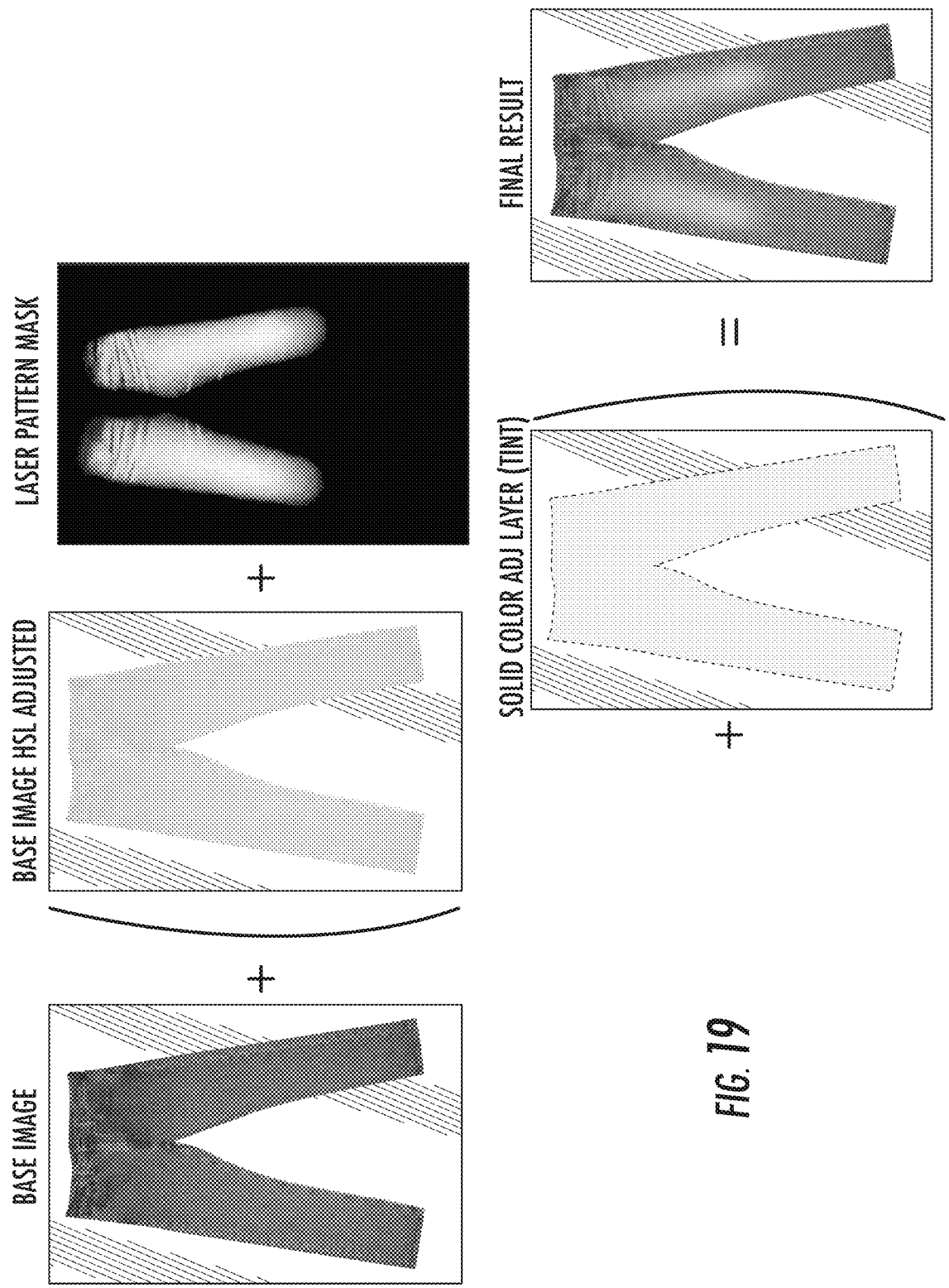
FIG. 19 shows a technique of generating a preview of a finished image using a brief tool.

FIG. 19 shows a technique of generating a preview of a finished image using a digital brief tool. A base image (or fabric template input) is selected. A hue saturation lightness (HSL) adjustment layer is created or generated for the selected base image. The HSL adjustment layer can be the base layer with an adjustment for hue saturation lightness. When tinting is selected, a solid color adjustment layer is created or generated. The solid color adjustment layer has a solid color (e.g., yellow, green, red, blue, or other color that is used for tinting the garment) that is in the same form or outline as the garment (e.g., pants), as indicated by the dotted lines in the figure.

To obtain a final result, which is the final image of the jeans with laser finishing pattern, a laser pattern mask is combined with the base image and HSL adjustment layer. A resulting combination will be based on intensity and bright point settings.

The laser pattern mask is a negative image or reverse image of the laser input file. For the laser input file, during laser burning, a white pixel means the pixel is not lasered (which results in the original indigo color of the fabric), and a black pixel means the pixel will be lasered at highest level (which results in the whitest color that can be achieved on the fabric). In an implementation, the laser input file has 256 levels of gray, and for levels between 0 (e.g., black) and 255 (e.g., white), then the amount of laser burning will be proportionally somewhere in between.

Figure 20:
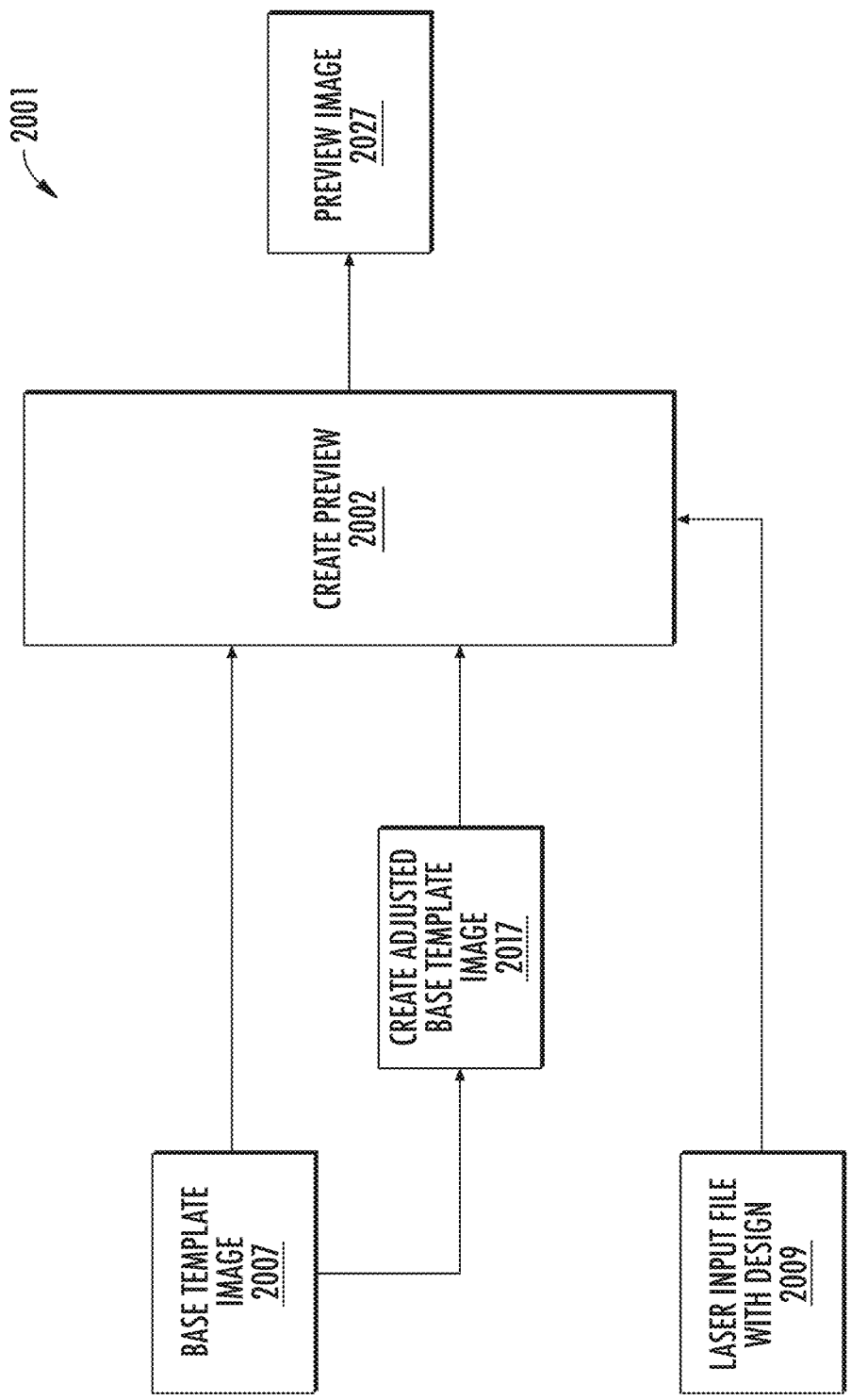
FIG. 20 shows a block diagram of a technique of generating a preview of a laser finishing pattern on a garment.

FIG. 20 shows a block diagram of a technique of generating a preview of a laser finishing pattern on a garment, such as jeans. The technique may be embodied in a preview generation tool 2001. Inputs to a create preview image process 2002 include a base template image 2007 and laser input file 2009. The base template image is used to create an adjusted base template image 2017, which is also input to the create preview image process. These create preview image process uses these three inputs to create a preview image 2027, which can be displayed on a computer screen for the user.

The adjusted base template image is created from the base template image by adjusting its hue, saturation, or lightness, or any combination of these. Compared to the original base template image, the adjusted base template image will appear washed out or bleached. In other words, the adjusted base template image will appear as if the garment in the base template image were fully bleached or lasered. The adjusted base template image can be an HLS adjustment layer as discussed above.

Digital Brief Tool

Embodiments of a digital brief tool (or garment preview tool) may execute on Apple Inc.'s iPad Pro tablet computer device. Although the screens portray the digital brief tool as executing on an iPad Pro, other suitable electronic devices may execute the digital brief tool. For example, the digital brief tool may execute on a Windows device (e.g., Windows 10 tablet), an Android device, other iPad product family models (e.g., iPad or iPad mini), or many other devices.

The iPad Pro 12.9 is a tablet device with rectangular dimensions of 12 inches by 8.68 inch, and is 0.27 inches thick. The iPad Pro has a 12.9-inch screen, and has nonvolatile memory storage of 64, 256, or 512 gigabytes. The iPad Pro has network connectivity via Wi-Fi and optionally cellular. The iPad Pro has an A10X Fusion chip with 64-bit architecture and an embedded M10 coprocessor. Some features of the digital brief tool can be accelerated by using specialized features available in the A10X Fusion chip or embedded M10 coprocessor, or both. An operating system of the iPad Pro is Apple iOS 11 (or greater when released). Further, the iPad Pro can be operated with a stylus, the Apple Pencil product. And in an implementation, the use can use the Apple Pencil with the digital brief tool.

The digital brief tool includes various features, allowing a designer to select, create, and visualize how an apparel item will look with certain characteristics, before the apparel item is produced. The digital brief tool may allow the designer, for one or more characteristics of a proposed apparel item, to assign one or more options to each of the characteristics. While assigning the options for characteristics, the digital brief tool allows the designer to see, based on currently assigned options, how the apparel item may appear when produced, in real time as changes are made.

Selecting gender, series, fit, fabric, or other characteristics in the digital brief tool may result in having only relevant options presented to the designer. For example, some characteristics or options may be specific to a particular gender. Upon selection of the particular gender, characteristics and options with the selected gender will appear for the designer to use for a proposed apparel item.

In an implementation, the digital brief tool is adapted for use with producing jeans. For example, the following figures may include various characteristics and options relevant to designing and stylizing of jeans. However, the digital brief tool may be adapted for use with other apparel items, such as shirts, jackets, pants, or socks.

Some specific implementations of a digital brief tool are discussed in U.S. applications Ser. Nos. 16/177,387, 16/177,412, and 16/177,407, all filed Oct. 31, 2018, which are incorporated by reference.

Three-Dimensional Previewing

FIGS. 21-30 describe a three-dimensional (3D) previewing tool of a laser finishing design tool. The three-dimensional previewing tool may be used in the system for creating, designing, producing apparel products with laser finishing as shown in FIG. 16.

The three-dimensional previewing tool allows users to see apparel, without needing to manufacture the apparel, to see how it may appear in the real world. For example, after creating or selecting a product, the user can view the product in 3D. This 3D preview feature allows a user to see a 360-degree preview of a garment with a laser finishing pattern as the garment would appear when it is worn by a person.

Figure 21:
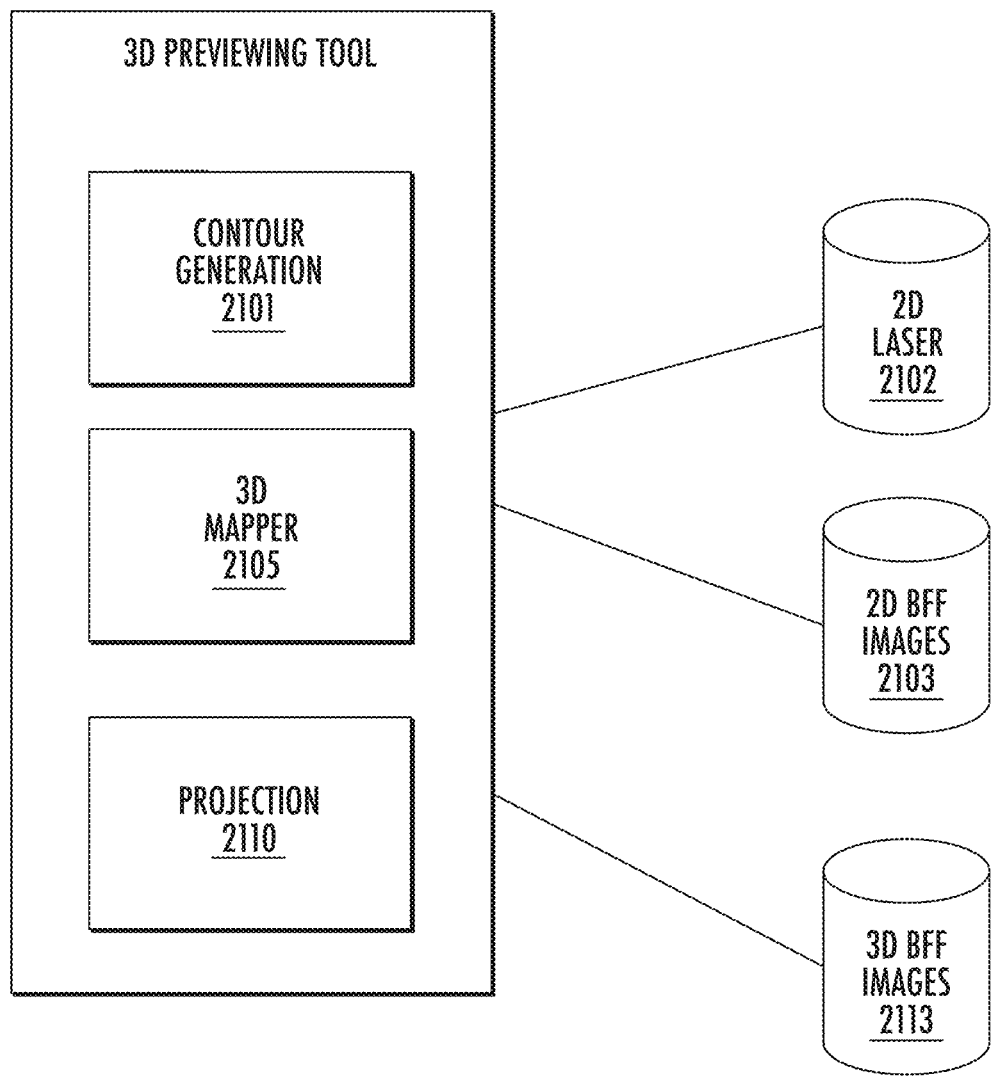
FIG. 21 shows a system diagram for a three-dimensional previewing tool.

FIG. 21 shows a system diagram for a three-dimensional previewing tool. The 3D previewing tool includes contour generation 2101, 3D mapper 2105, and projection 2110. The contour projection 2101 takes two-dimensional (2D) images from a 2D BFF images database 2103, to understand how, from the 2D BFF images, each BFF of the BFF images would appear in real-world. There may be multiple BFFs stored in the 2D BFF images database and multiple images of each BFF. The 3D mapper 2105 processes the contours from the contour generation 2101 and, based on a 2D laser image from a 2D laser database 2102. The 2D laser database stores one or more 2D images of a wear pattern that may be applied onto garments using a laser. The projection 2110 projects the wear pattern onto the 2D images of the BFF. These are stored in a 3D BFF images database 2113.

Figure 22:
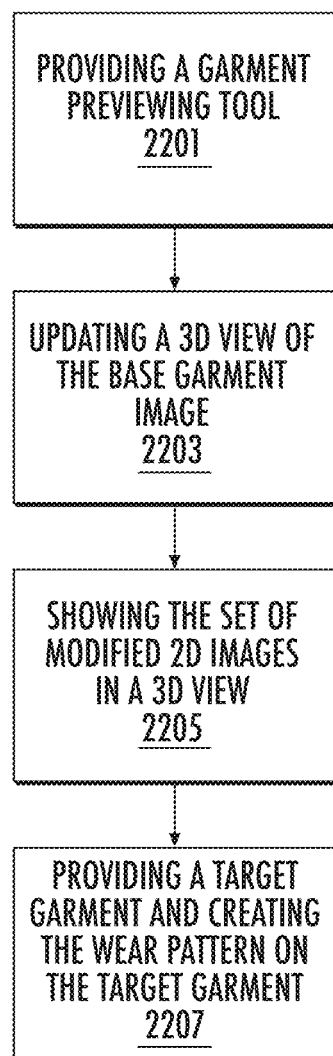
FIG. 22 shows a flow of creating 3D imagery of an apparel design system.

FIG. 22 shows a flow of creating 3D imagery of an apparel design system. In a step 2201, the system includes providing a garment previewing tool. The garment previewing tool may be the digital brief tool, as described elsewhere in this application. The digital brief may provide various options for a user, such as providing options for the user to select a base garment image. For example, the base garment image may be a jeans base garment. The base garment image may be composed of any material suitable for laser finishing. The user may also select a wear pattern, associated with a laser pattern file that may be processed to create the wear pattern onto a target garment corresponding to the base garment image. The user may also modify the position, the sizing, or a combination, of the wear pattern. For example, as the base garment image is shown, the user may modify the position, the sizing, or the combination, of the wear pattern. In response to, or in near real-time, the system may show to the user the modifications, without needing to first manufacture the target garment.

In a step 2203, the system includes updating a 3D view of the base garment image. For example, the user's selected wear pattern includes a 2D image of the wear pattern and the selected base garment image corresponds to a set of 2D images. The set of 2D images may be generated using a contour generation process. During the contour generation process, the selected garment base is worn by a mannequin, so that it is not flat.

The system processes the user's modification and, for each image of the set of 2D images, determines how the modified wear pattern should appear and stores the modified set of 2D images. For some images of the set of 2D images, the user's modification may not be applicable. For example, the user's selected wear pattern may only include a wear pattern for the front of the target garment. Thus, for the set of 2D images which show only the rear of the garment base, would not be applicable. As another example, the selected wear pattern for a specific image may only be partially applicable. For an off-center image of the base garment, not all the selected wear pattern may appear, since the angle of the base garment that the 2D image is captured would result in the selected wear pattern being partially obscured.

In a step 2205, the system includes showing the set of modified 2D images in a 3D view. For example, the 3D view may include allowing the user to rotate the set of modified 2D images. The user may drag and rotate or click and rotate the modified 2D images so that, as the user manipulates the set of modified 2D images, the different images from the set of modified 2D images are shown to the user. Each of the set of modified 2D images may include a view of the selected garment base at a different angle. The different angles may be approximately the same number of degrees between each consecutive image.

The user may also be provided with additional options to further modify sizing or positioning of the wear pattern, or choose a new wear pattern. The 3D view may include the set of modified 2D images as a graphics interchange format (or GIF).

In a step 2207, the system includes providing a target garment and creating the wear pattern on the target garment. The target garment includes a real-world version of the base garment selected by the user. For example, the target garment is a pair of jeans, adapted for laser finishing. From the input with modified sizing or positioning from the user, the target garment is finished with the wear pattern.

Figure 23:
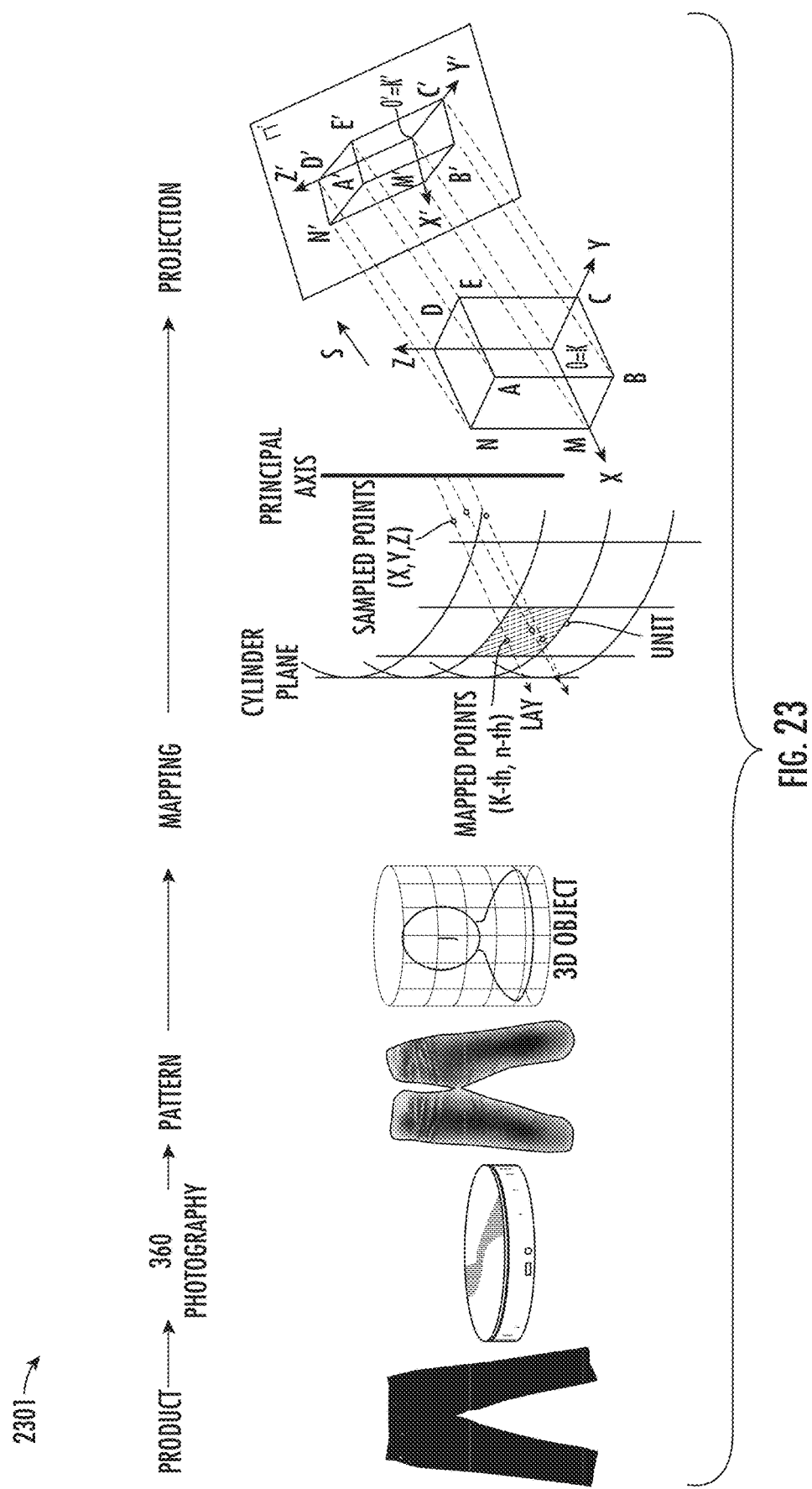
FIG. 23 shows an overall flow for creating a three-dimensional preview for a particular apparel product, such as a pair of jeans.

FIG. 23 shows an overall flow 2301 for creating a three-dimensional preview for a particular apparel product, such as a pair of jeans. With 360 degree or 3D photography of a target garment and a mapping of the laser pattern to an approximate or measured 3D surface, the user can view and rotate the created product with laser pattern in 3D using techniques described previously.

More specifically, the unfinished jeans are placed on a mannequin or model. A series of photographs of the jeans on the mannequin are taken while on a turntable, which rotates 360 degrees. The user selects a laser input file with a laser finished pattern that is to be applied to the preview. However, the laser input file is for jeans when flat, not worn. This is because the jeans will be lasered while flat. In order to apply the laser input file correctly to the mannequin-worn jeans, a mapping of the contours of the jeans as worn by the mannequin is performed. With this mapping, the laser input file is altered or distorted using a mathematical transformation (e.g., projection) onto the mapping. This results in an accurate preview of the worn jeans with laser finish pattern. The user will be able to see a 360-degree view of the jeans with finishing pattern. This preview may be provided in a digital file, such as a video file or image file. In a specific implementation, an animated Graphics Interchange Format (GIF) format is used.

Figure 24:
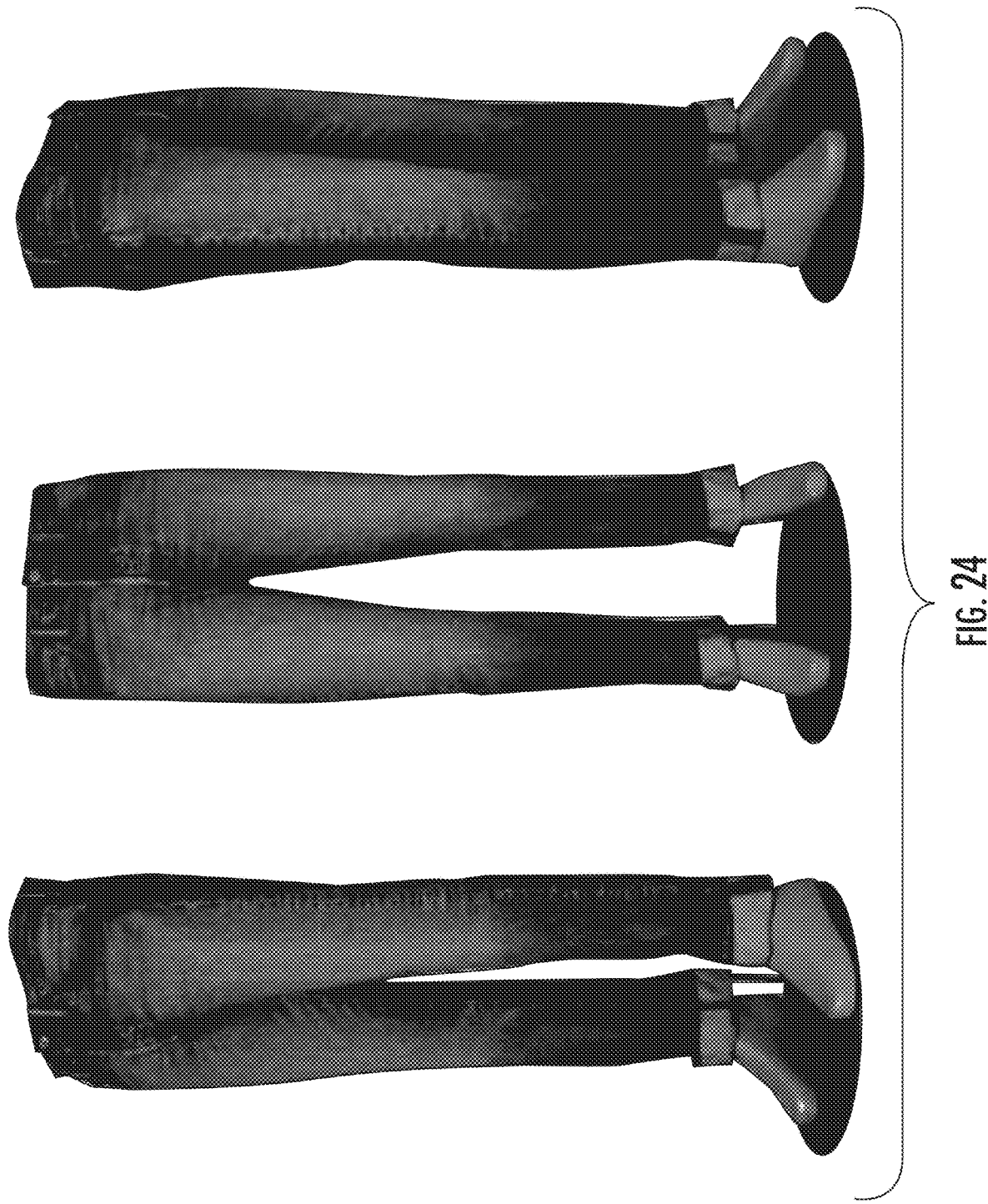
FIG. 24 shows using a turntable that may be used to capture series of photographs of the jeans on the mannequin.

FIG. 24 shows using a turntable that may be used to capture series of photographs of the jeans on the mannequin.

Figure 25:
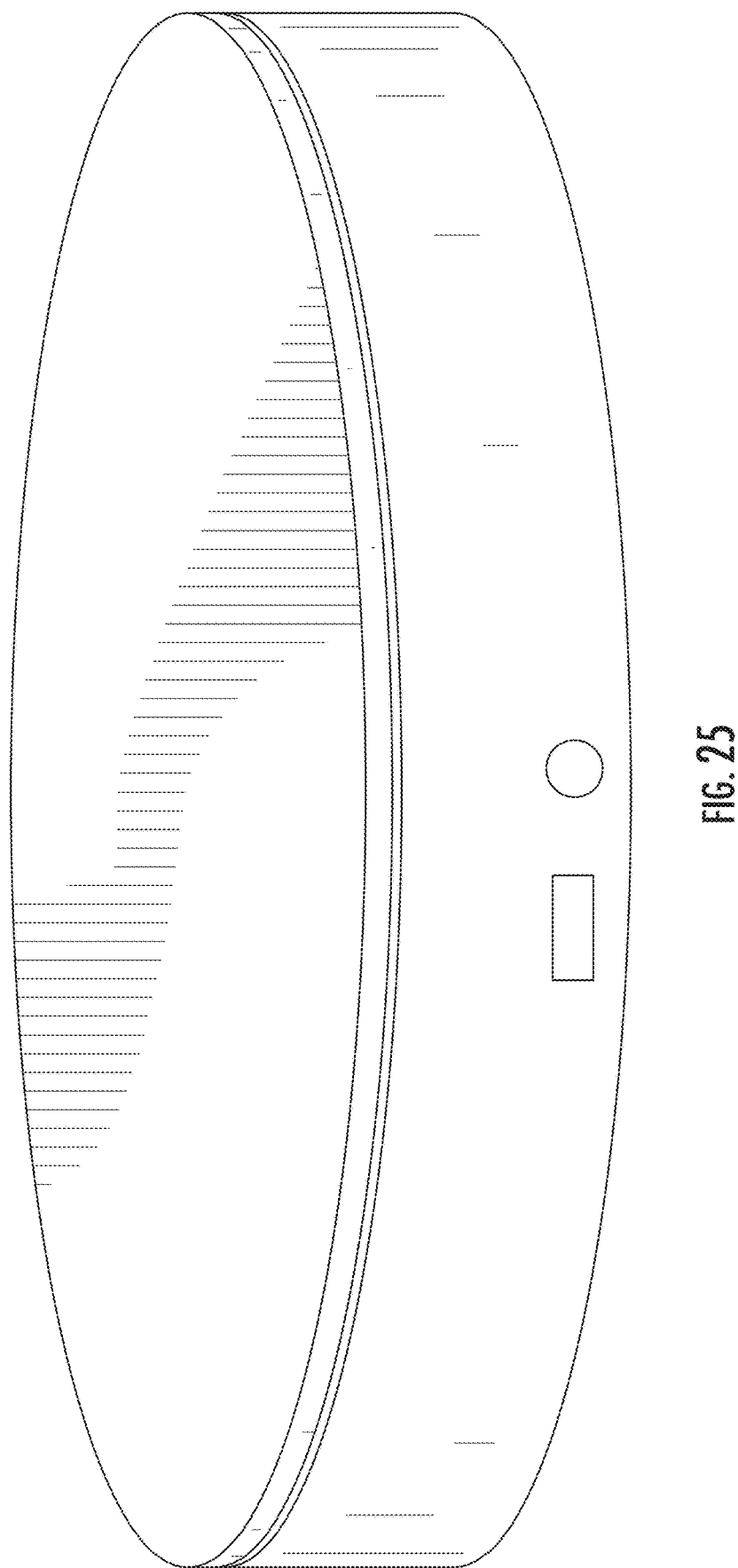
FIG. 25 shows an electric turntable which turns one revolution or 360 degrees automatically.

FIG. 25 shows an electric turntable which turns one revolution or 360 degrees automatically, while the camera is set to capture a number of photos during that rotation. Alternatively, instead of using a turntable, a rotatable camera can be set up at and moved or rotated 360 degrees around the worn jeans. The camera is set at a fixed distance from the turntable or mannequin.

A set of 360-degree photographs will be taken of any fit or base shade intended for display. A process for repeatable and known rotation angles is required. Alignment landmark locations will also need to be selected at data creation.

The number of photos that are taken can vary. For example, 15 photos can be taken, which would result in one photo for every 24 degrees; 30 photos can be taken, which would result in one photo for every 12 degrees; 60 photos can be taken, which would result in one photo for every 6 degrees; or 120 photos can be taken, which would result in one photo for every 3 degrees. The more photos that are taken, the more views the user will be able to see in the 3D preview. However, the file size will be larger and processing time needed to create the 3D preview will be greater. The photos captured are of base fabric templates without any laser finishing.

Figure 26:
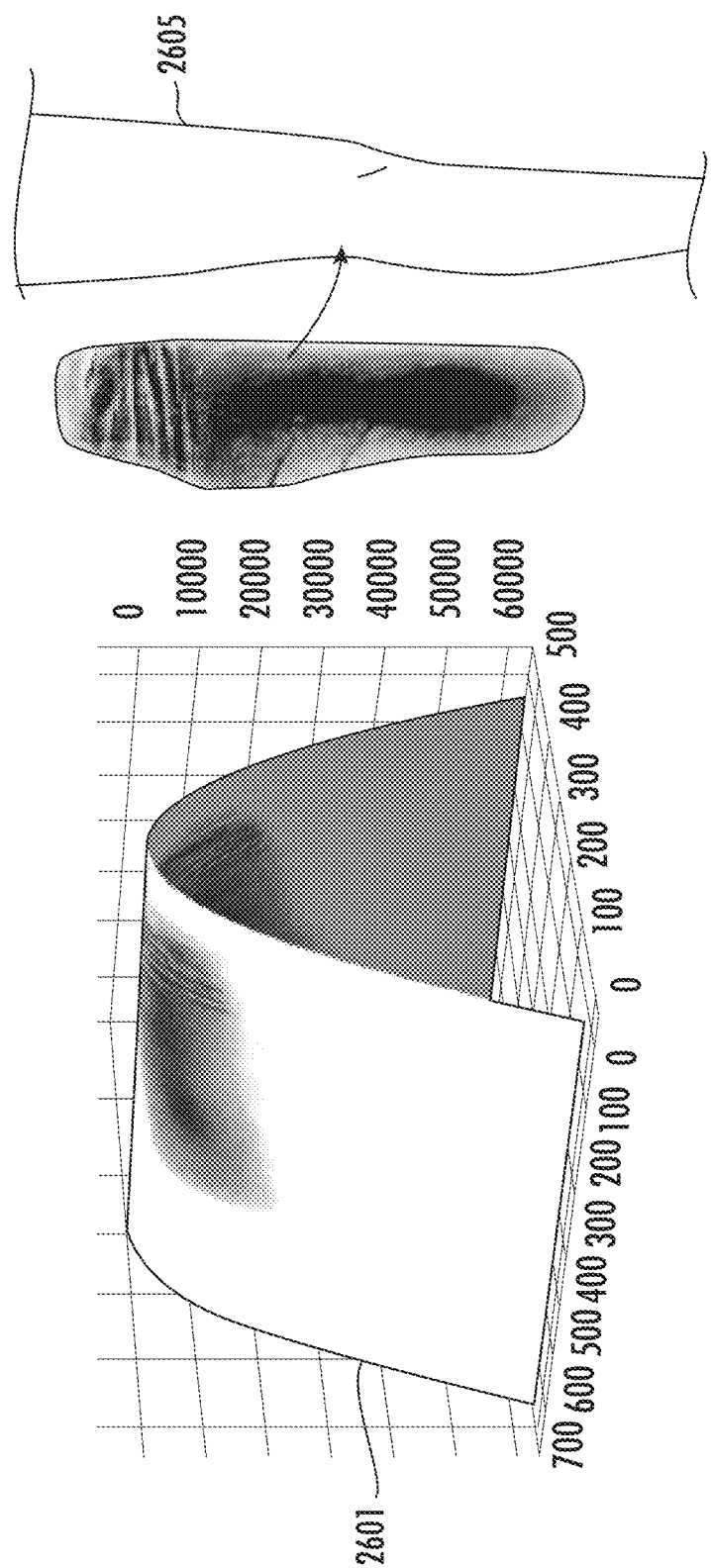
FIG. 26 shows an example of a three-dimensional mapping onto contours or shape of the mannequin or model wearing the jeans.

FIG. 26 shows an example of a three-dimensional mapping onto contours or shape of the mannequin or model wearing the jeans. A three-dimensional mapping 2601 of the two-dimensional pattern file 2605 is generated. This may initially use a simple fixed geometry but modified further to accept any input geometry. This mapping will initialize with alignment markers.

Figure 27:
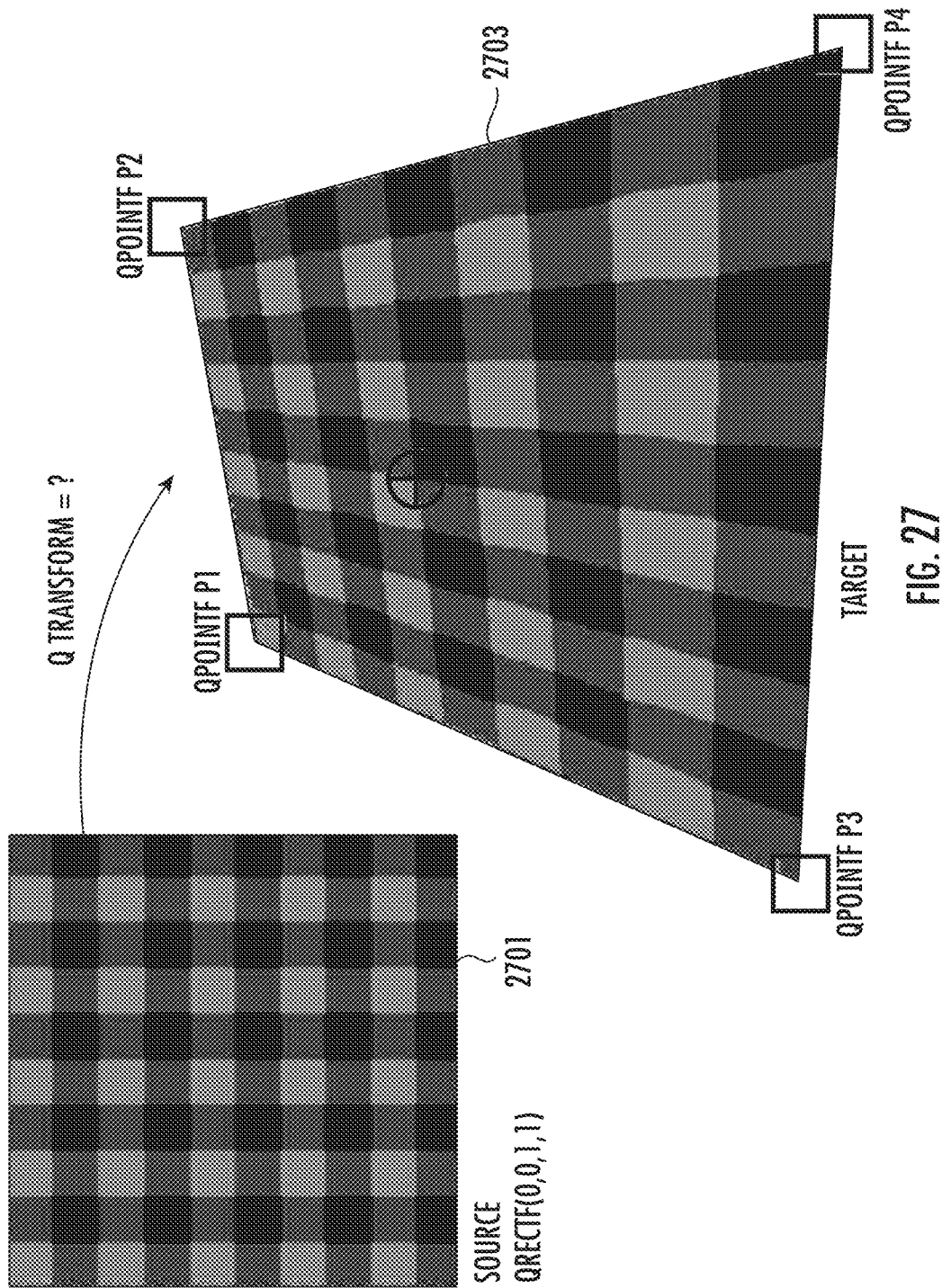
FIG. 27 shows an example of perspective transformation.

FIG. 27 shows an example of perspective transformation. For all photos in the rotating photo set, a perspective transformation will be performed on the 3D-mapped pattern files. Rotation will initially only be about the long axis. In other implementations, rotation can be about any arbitrary axis. For example, a source image 2701 is transformed onto a three-dimensional surface, such as a target image 2703. The target image 2703 includes multiple points, such as the corners of the target image 2703, which is processed by the 3D previewing tool to understand how the source image 2701 should appear.

Figure 28:
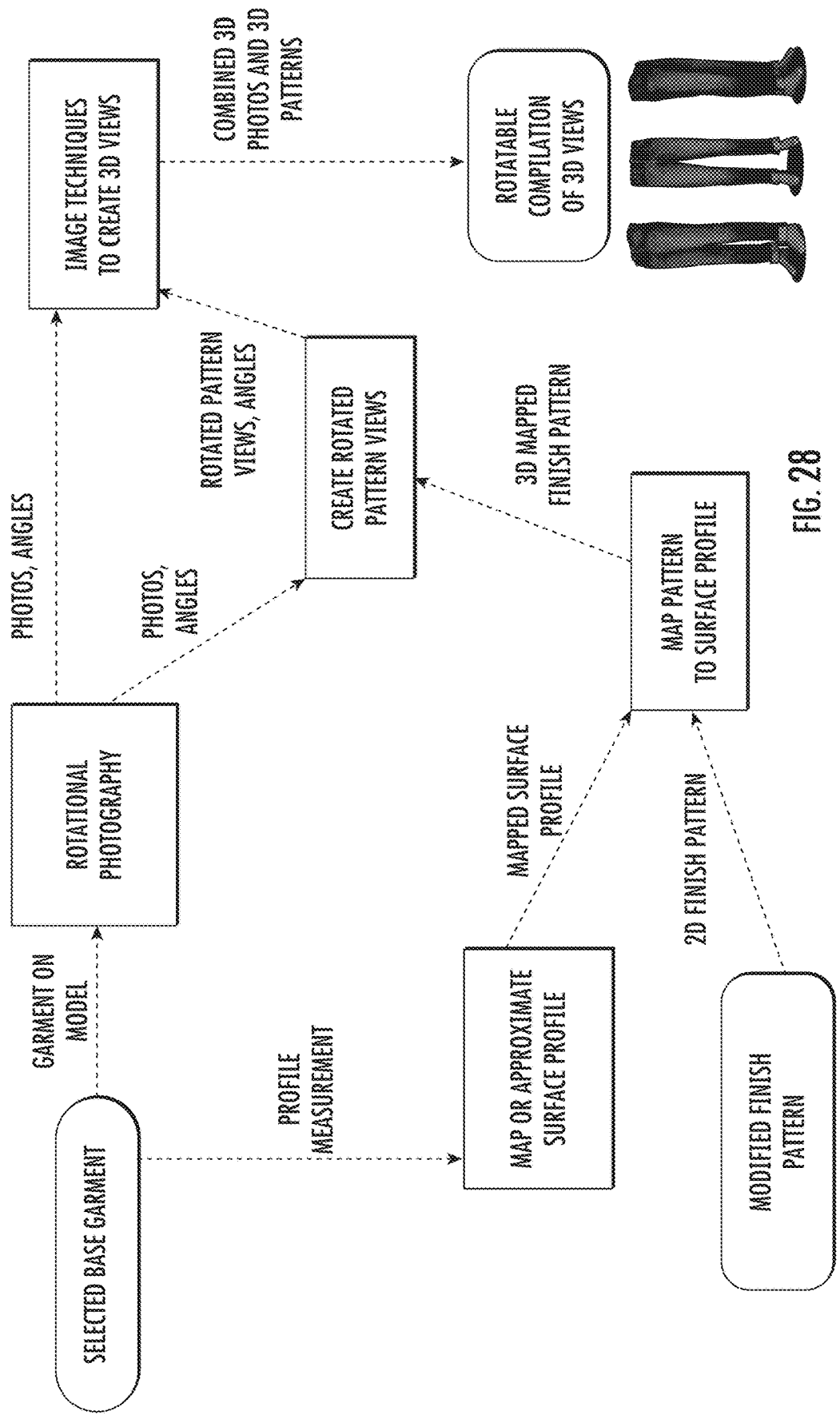
FIG. 28 shows a more detailed flow for creating a three-dimensional preview.

FIG. 28 shows a more detailed flow for creating a three-dimensional preview. A base garment is selected. The base garment may be any piece of apparel where the laser finish is to be applied. The base garment is placed on a model. Rotational photography is performed to capture a set of 360-degree photos at various angles of the base garment.

Using the selected base garment, a profile measurement is taken. This profile measurement is input to a map or approximate surface profile process, which maps or approximates the surface of the base garment to generate a mapped surface profile.

There is a map pattern to surface profile process, which takes as input the mapped surface file and a two-dimensional finish pattern. The map pattern to surface profile process creates a three-dimensional mapped finish pattern from these inputs.

A created rotated pattern views process takes as input the set of 360-degree photos and the 3D mapped finish pattern, and generates rotated pattern views and angles. Image techniques are used to create 3D views from 3D photos and 3D patterns, using as input the 360-degree photos and the rotated pattern views and angles. The rotated pattern views and angles will result in a rotatable compilation of 3D views, which are viewable using a view (e.g., GIF viewer).

Figure 29:
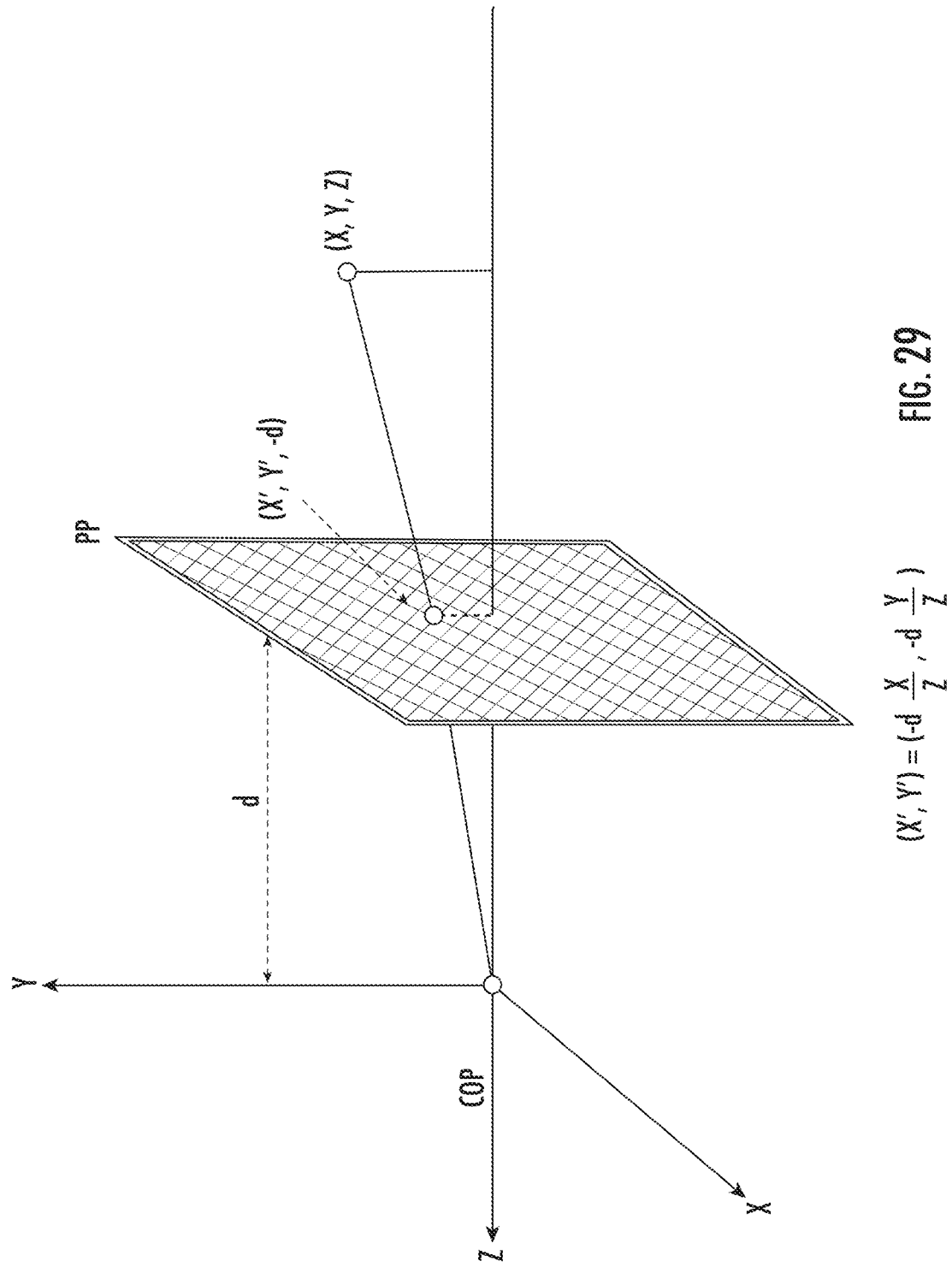
FIG. 29 shows a graph and equation for a mathematical technique to map or approximate a surface profile.

FIG. 29 shows a graph and equation for a mathematical technique to map or approximate a surface profile. The result of using this technique is a mapped surface profile. An estimate of shape distortion of a 2D image can be obtained by calculating known distances in 3D (e.g., via scan or depth image). An approximate 3D transform can also be performed. With this, multiple views can be shown from by using only a single mapping.

In FIG. 27, the variables are: x'=x position in image; y'=y position in image; d=distance to image plane; X=Real world X position; Y=Real world Y position; and Z=Real world Z position.

FIG. 30 shows of a technique of shape projection. With a 3D mapping of the finish pattern, multiple views can be produced through rotations about a specified axis. There is a matrix for rotation Z, rotation Y, and rotation X. There is a matrix for scaling in three dimensions. There is a matrix for translation in three dimensions. By matrix multiple, these matrices are used to calculated new X, Y, and Z coordinates at a desired rotation angle. As an example, a vector X, Y, Z is multiplied by the rotation Z matrix to determine new X, Y, Z coordinates rotated by theta degrees about Z.

In FIG. 30, the variables are: θ=rotation angle about Z; β=rotation angle about Y; α=rotation angle about X; Sx=scale factor in X; Sy=scale factor in Y; Sz=scale factor in Z; Tx=translation in X; Ty=translation in Y; Tz=translation in Z; X=current X position; Y=current Y position; and Z=current Z position.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a garment previewing tool that allows previewing on a computer screen of a selected garment base customized by a user with a finishing pattern created using a laser input file by a laser, wherein the garment previewing tool includes
providing an option for the user to select the garment base and upon the user's selection, showing a first garment preview imagery on the computer screen comprising a jeans base image for the selected garment base,
providing an option for the user to select a wear pattern from a menu of wear patterns, wherein each wear pattern is associated with a laser input file to be used by a laser to produce that wear pattern onto a jeans garment,
showing a second garment preview imagery on the computer screen comprising the selected wear pattern in combination with the jeans base image, wherein the second garment preview imagery replaces the first garment preview image,
the second garment preview imagery is generated comprising
generating an adjusted base image from the jeans base image without the selected wear pattern,
generating a pattern mask based on the laser input file associated with the selected wear pattern,
for a pixel at a pixel location of the second garment preview imagery, obtaining a first contribution by combining a first value associated with a pixel of the pattern mask at a pattern mask pixel location that corresponds to the pixel location of the second garment preview imagery and a value of a pixel of the jeans base image at a base image pixel location that corresponds to the pixel location of the second garment preview imagery,
for the pixel at the pixel location of the second garment preview imagery, obtaining a second contribution by combining a second value associated with the pixel of the pattern mask at the pattern mask pixel location that corresponds to the pixel location of the second garment preview imagery and a value of a pixel of the adjusted base image at an adjusted base image pixel location that corresponds to the pixel location of the second garment preview imagery,
combining the first contribution and the second contribution to obtain a combined value for the pixel at the pixel location of the second garment preview imagery, and
updating for display the pixel of the second garment preview imagery as a color on the computer screen, wherein the color of the pixel corresponds to the combined value,
in the second garment preview imagery, allowing the user to select the wear pattern and modify a position or sizing of the wear pattern relative to the jeans base image, wherein as the user makes changes, the modified positioning or sizing of the wear pattern is displayed to the user in response to selecting and modifying the position or sizing of the wear pattern, and
after allowing the user to select the wear pattern and modify a position or sizing of the wear pattern relative to the jeans base image, generating a third garment preview imagery of the selected garment base with the selected wear pattern comprising
receiving a set of images of the selected garment base, without a wear pattern, wherein the set of images comprises a plurality of two-dimensional images of the selected garment base,
receiving a two-dimensional wear pattern image associated with the selected wear pattern, and
generating a three-dimensional preview of the selected garment base with the selected wear pattern applied onto the surface of the selected garment base using the set of images of the selected garment base and the two-dimensional wear pattern image with the modified positioning or sizing of the selected wear pattern;
providing a target garment corresponding to the garment base selected by the user; and
based on a laser input file associated with a selected wear pattern with modified sizing or modified positioning, or a combination, using a laser to create a finishing pattern on an outer surface of the target garment.

2. The method of claim 1 wherein the garment previewing tool includes
in response to selecting the wear pattern, generating the second garment preview imagery of the selected garment base with the selected wear pattern comprising
generating another three-dimensional preview of the selected garment base with the selected wear pattern applied onto the surface of the selected garment base using the set of images of the selected garment base and the two-dimensional wear pattern image, wherein the second garment preview imagery comprises the selected wear pattern in a different sizing or positioning than the third garment preview imagery.

3. The method of claim 1 wherein the third garment preview imagery is stored as a Graphics Interchange Format image.

4. The method of claim 1 wherein the garment previewing tool includes allowing the user to see multiple views of the third garment preview imagery at different angles.

5. The method of claim 1 wherein the garment previewing tool includes:
providing an option for the user to select another wear pattern from the menu of wear patterns,
showing a fourth garment preview imagery on the computer screen comprising the other selected wear pattern in combination with the jeans base image,
in the fourth garment preview imagery, allowing the user to select the other wear pattern and modify a position or sizing of the other wear pattern relative to the jeans base image, wherein as the user makes changes, the modified positioning or sizing of the other wear pattern is displayed to the user in response to selecting and modifying the position or sizing of the other wear pattern, and
in response to modifying the position or sizing of the selected other wear pattern, generating a fifth garment preview imagery of the selected garment base with the selected other wear pattern comprising
receiving the set of images of the selected garment base, without a wear pattern,
receiving another two-dimensional wear pattern image associated with the other selected wear pattern, and
generating a three-dimensional preview of the selected garment base with the selected other wear pattern applied onto the surface of the selected garment base using the set of images of the selected garment base and the other two-dimensional wear pattern image with the modified positioning or sizing of the selected other wear pattern,
showing the fifth garment preview imagery on the computer screen comprising the jeans base image and selected other wear pattern, with modified sizing or modified positioning, or a combination.

6. The method of claim 1 further comprising a method of manufacturing the target garment comprising
assembling the target garment from fabric panels of a woven first material comprising a warp comprising indigo ring-dyed cotton yarn, wherein the fabric panels are sewn together using thread.

7. The method of claim 1 wherein based on the laser input file, the laser removes selected amounts of material from the surface of a material of the target garment at different pixel locations of the garment, and
for lighter pixel locations of the finishing pattern, a greater amount of the indigo ring-dyed cotton warp yarn is removed, while for darker pixel locations of the finishing pattern, a lesser amount of the indigo ring-dyed cotton warp yarn is removed.

8. The method of claim 1 wherein when using the laser to create a finishing pattern, different laser levels are obtained by varying an output of the laser beam by altering a characteristic of the laser comprising at least one of a frequency, period, pulse width, power, duty cycle, or burning speed.

9. The method of claim 1 wherein the target garment is made of at least one of a twill material or a cotton twill material.

10. The method of claim 1 wherein the garment base corresponds to a base fit fabric and the base fit fabric includes known characteristics regarding the suitability of the base fit fabric for finishing using the laser.

11. The method of claim 1 wherein the set of images of the selected garment base is generated using a contour generation process, wherein during the contour generation process, the selected garment base is worn by a mannequin.

12. The method of claim 1 wherein the set of images of the selected garment base is generated using a contour generation process, wherein during the contour generation process, the selected garment base is not flat.

13. The method of claim 1 wherein generating the third garment preview imagery is generated in near real-time with the user's modification of the sizing or positioning of the selected wear pattern.

14. The method of claim 1 wherein the three-dimensional preview comprises a set of two-dimensional images.

15. The method of claim 1 wherein the three-dimensional preview comprises at least one two-dimensional image without the selected wear pattern.

16. The method of claim 1 wherein the selected wear pattern comprises at least one of combs or honeycombs, whiskers, stacks, or train tracks, or a combination.

17. The method of claim 1 wherein the using the laser to create a finishing pattern comprises making a single pass with the laser.

18. The method of claim 1 wherein the target garment comprises denim garments.

19. The method of claim 1 wherein the target garment comprises a pair of jeans.

20. The method of claim 1 wherein the target garment comprises a top.

21. The method of claim 1 wherein the selected wear pattern comprises at least one of combs or honeycombs, whiskers, stacks, or train tracks, or a combination.

22. The method of claim 21 wherein the allowing the user to select a desired angle with which to view the three-dimensional preview comprises:
allowing the user to use a pointing device to rotate the three-dimensional preview to a desired viewing angle.

23. The method of claim 21 wherein the allowing the user to select a desired angle with which to view the three-dimensional preview comprises:
allowing the user to use a pointing device to rotate the three-dimensional preview to a desired viewing angle, wherein the rotation is permitted only about a single axis.

24. The method of claim 21 wherein the allowing the user to select a desired angle with which to view the three-dimensional preview comprises:
allowing the user to use a pointing device to rotate the three-dimensional preview to a desired viewing angle, wherein the rotation is permitted about any arbitrary axis.

25. The method of claim 21 wherein the three-dimensional preview comprises a Graphics Interchange Format (GIF) image comprising a plurality of images.

26. The method of claim 21 wherein the three-dimensional preview comprises at least 15 images.

27. The method of claim 21 wherein the three-dimensional preview comprises at least 30 images.

28. The method of claim 21 wherein the three-dimensional preview comprises at least 60 images.

29. The method of claim 21 wherein the three-dimensional preview comprises at least 120 images.

30. A method comprising:
providing a garment previewing tool that allows previewing on a computer screen of a selected garment base customized by a user with a finishing pattern created using a laser input file by a laser, wherein the garment previewing tool includes providing an option for the user to select the garment base and upon the user's selection, showing a first garment preview imagery on the computer screen comprising a jeans base image for the selected garment base, providing an option for the user to select a wear pattern from a menu of wear patterns, wherein each wear pattern is associated with a laser input file to be used by a laser to produce that wear pattern onto a jeans garment, generating a second garment preview imagery comprising the selected wear pattern in combination with the jeans base image, wherein the generating the second garment preview imagery comprises generating an adjusted base image from the jeans base image without the selected wear pattern, generating a pattern mask based on the laser input file associated with the selected wear pattern, for a pixel at a pixel location of the second garment preview imagery, obtaining a first contribution by combining a first value associated with a pixel of the pattern mask at a pattern mask pixel location that corresponds to the pixel location of the second garment preview imagery and a value of a pixel of the jeans base image at a base image pixel location that corresponds to the pixel location of the second garment preview imagery, for the pixel at the pixel location of the second garment preview imagery, obtaining a second contribution by combining a second value associated with the pixel of the pattern mask at the pattern mask pixel location that corresponds to the pixel location of the second garment preview imagery and a value of a pixel of the adjusted base image at an adjusted base image pixel location that corresponds to the pixel location of the second garment preview imagery, combining the first contribution and the second contribution to obtain a combined value for the pixel at the pixel location of the second garment preview imagery, and updating the pixel of the second garment preview imagery as a color on the computer screen, wherein the color of the pixel corresponds to the combined value, and after the second garment preview imagery is generated, generating a third garment preview imagery of the selected garment base with the selected wear pattern comprising receiving a set of images of the selected garment base, without a wear pattern, wherein the set of images comprises a plurality of two-dimensional images of the selected garment base, receiving a two-dimensional wear pattern image associated with the selected wear pattern, and generating a three-dimensional preview of the selected garment base with the selected wear pattern applied onto the surface of the selected garment base using the set of images of the selected garment base and the two-dimensional wear pattern image; and displaying the three-dimensional preview on the computer screen generated using the set of images of the selected garment base and the two-dimensional wear pattern image.

31. The method of claim 30 comprising:
providing a target garment corresponding to the garment base selected by the user; and
based on a laser input file associated with a selected wear pattern with modified sizing or modified positioning, or a combination, using a laser to create a finishing pattern on an outer surface of the target garment.

32. The method of claim 30 wherein the third garment preview imagery is stored as a Graphics Interchange Format (GIF) image.

33. The method of claim 30 wherein the garment previewing tool comprises allowing the user to see multiple views of the third garment preview imagery at different angles.

34. The method of claim 30 wherein the set of images of the selected garment base is generated using a contour generation process, and during the contour generation process, the selected garment base is worn by a mannequin.

35. The method of claim 30 wherein the set of images of the selected garment base is generated using a contour generation process, and during the contour generation process, the selected garment base is not flat.

36. The method of claim 30 wherein the generating the third garment preview imagery occurs in real-time.

37. The method of claim 30 wherein the generating the third garment preview imagery occurs in near real-time.

38. The method of claim 30 wherein the three-dimensional preview comprises a set of two-dimensional images.

39. The method of claim 30 wherein the three-dimensional preview comprises at least one two-dimensional image without the selected wear pattern.

40. A method comprising:
providing a garment previewing tool that allows previewing on a computer screen of a selected garment base customized by a user with a finishing pattern created using a laser input file by a laser, wherein the garment previewing tool includes providing an option for the user to select the garment base and upon the user's selection, showing a first garment preview imagery on the computer screen comprising a jeans base image for the selected garment base, providing an option for the user to select a wear pattern from a menu of wear patterns, wherein each wear pattern is associated with a laser input file to be used by a laser to produce that wear pattern onto a jeans garment, generating a second garment preview imagery comprising the selected wear pattern in combination with the jeans base image, wherein the generating the second garment preview imagery comprises generating an adjusted base image from the jeans base image without the selected wear pattern, generating a pattern mask based on the laser input file associated with the selected wear pattern, for a pixel at a pixel location of the second garment preview imagery, obtaining a first contribution by combining a first value associated with a pixel of the pattern mask at a pattern mask pixel location that corresponds to the pixel location of the second garment preview imagery and a value of a pixel of the jeans base image at a base image pixel location that corresponds to the pixel location of the second garment preview imagery, for the pixel at the pixel location of the second garment preview imagery, obtaining a second contribution by combining a second value associated with the pixel of the pattern mask at the pattern mask pixel location that corresponds to the pixel location of the second garment preview imagery and a value of a pixel of the adjusted base image at an adjusted base image pixel location that corresponds to the pixel location of the second garment preview imagery, combining the first contribution and the second contribution to obtain a combined value for the pixel at the pixel location of the second garment preview imagery, and updating the pixel of the second garment preview imagery as a color on the computer screen, wherein the color of the pixel corresponds to the combined value, and after the second garment preview imagery is generated, generating a third garment preview imagery of the selected garment base with the selected wear pattern comprising receiving a set of images of the selected garment base, without a wear pattern, wherein the set of images comprises a plurality of two-dimensional images of the selected garment base, receiving a two-dimensional wear pattern image associated with the selected wear pattern, and generating a three-dimensional preview of the selected garment base with the selected wear pattern applied onto the surface of the selected garment base using the set of images of the selected garment base and the two-dimensional wear pattern image;

displaying the three-dimensional preview on the computer screen generated using the set of images of the selected garment base and the two-dimensional wear pattern image; and by way of the garment previewing tool, allowing the user to select a desired viewing angle with which to view the three-dimensional preview.

* * * * *